(12) United States Patent
Lee et al.

(10) Patent No.: US 8,070,142 B2
(45) Date of Patent: Dec. 6, 2011

(54) DOWNCOMER DISTRIBUTOR

(75) Inventors: Adam T. Lee, Dallas, TX (US); Larry W. Burton, Waxahachie, TX (US); Zainab Kayat, Selangor (MY); Pau Kiew Huai, Petaling Jaya (MY)

(73) Assignees: AMT International, Inc., Plano, TX (US); Petroliam Nasional Berhad, Kuala Lumpur (MY)

( * ) Notice: Subject to any disclaimer, the term of this patent is extended or adjusted under 35 U.S.C. 154(b) by 987 days.

(21) Appl. No.: 12/018,882

(22) Filed: Jan. 24, 2008

(65) Prior Publication Data
US 2009/0189301 A1    Jul. 30, 2009

(51) Int. Cl.
*B01D 3/20* (2006.01)
*B01D 3/32* (2006.01)

(52) U.S. Cl. .................................. 261/114.1; 261/114.5

(58) Field of Classification Search .................. 261/103, 261/106, 110, 113, 114.1, 114.5; 95/210, 95/213; 96/290, 296
See application file for complete search history.

(56) References Cited

U.S. PATENT DOCUMENTS

| | | |
|---|---|---|
| 3,218,048 A | 11/1965 | Smith, Jr. et al. |
| 3,450,393 A | 6/1969 | Munters |
| 3,647,192 A | 3/1972 | DeGroot et al. |
| 3,729,179 A | 4/1973 | Keller |
| 3,747,905 A | 7/1973 | Nutter |
| 3,887,665 A | 6/1975 | Mix et al. |
| 3,959,419 A | 5/1976 | Kitterman |
| 4,105,723 A | 8/1978 | Mix |
| 4,132,761 A | 1/1979 | Mix |
| 4,274,923 A | 6/1981 | Mahar |
| 4,300,918 A | 11/1981 | Cary |
| 4,528,068 A | 7/1985 | Fiocco et al. |
| 4,597,916 A | 7/1986 | Chen |
| 4,603,022 A | 7/1986 | Yoneda et al. |
| 4,604,247 A | 8/1986 | Chen et al. |
| 4,818,346 A | 4/1989 | Bentham et al. |
| 4,842,778 A | 6/1989 | Chen et al. |
| 4,950,430 A | 8/1990 | Chen et al. |
| 4,954,294 A | 9/1990 | Bannon |
| 5,139,544 A | 8/1992 | Lucero et al. |
| 5,164,125 A | 11/1992 | Binkley et al. |
| 5,192,466 A | 3/1993 | Binkley |

(Continued)

FOREIGN PATENT DOCUMENTS

EP    0 250 020 A2    12/1987

(Continued)

OTHER PUBLICATIONS

King, C. Judson, "Separation Processes", McGraw-Hill Book Company, 2d edition, 1980, pp. 614.

(Continued)

*Primary Examiner* — Frank Lawrence, Jr.
(74) *Attorney, Agent, or Firm* — Davis & Bujold, P.L.L.C.

(57) ABSTRACT

A tray assembly is provided for improved gas/liquid contact when used in a large chemical process tower. Each tray has a downcomer wall of which the lower portion is a distributor. The distributor has discharge ports sized to control the rate of liquid flow at different positions across the distributor and flanges aligned individually to direct liquid flow from different discharge ports across different areas of the tray deck immediately below the downcomer. In combination, discharge ports and liquid flow directing flanges effect even liquid flow across the surface of the tray immediately below. Benefits of this invention are trays with better mass transfer efficiency and enhanced capacity compared with prior art trays.

22 Claims, 24 Drawing Sheets

U.S. PATENT DOCUMENTS

| | | | |
|---|---|---|---|
| 5,213,719 A | 5/1993 | Chuang | |
| 5,244,604 A | 9/1993 | Miller et al. | |
| 5,262,094 A | 11/1993 | Chuang | |
| 5,269,976 A | 12/1993 | Biddulph et al. | |
| 5,277,847 A | 1/1994 | Gentry et al. | |
| 5,277,848 A | 1/1994 | Binkley et al. | |
| 5,366,666 A | 11/1994 | Chuang et al. | |
| 5,389,343 A | 2/1995 | Gentry | |
| 5,439,510 A | 8/1995 | Lerner | |
| 5,453,222 A | 9/1995 | Lee et al. | |
| 5,454,989 A | 10/1995 | Nutter | |
| 5,554,329 A | 9/1996 | Monkelbaan et al. | |
| 5,707,563 A | 1/1998 | Monkelbaan et al. | |
| 5,762,668 A | 6/1998 | Lee et al. | |
| 5,837,105 A | 11/1998 | Stober et al. | |
| 5,972,171 A | 10/1999 | Ross et al. | |
| 5,975,504 A | 11/1999 | Nutter et al. | |
| 6,003,847 A * | 12/1999 | Lee et al. | 261/114.1 |
| 6,029,956 A | 2/2000 | McGrath | |
| 6,053,484 A | 4/2000 | Fan et al. | |
| 6,059,934 A | 5/2000 | Stober et al. | |
| 6,076,813 A | 6/2000 | Yeoman et al. | |
| 6,287,367 B1 | 9/2001 | Buchanan et al. | |
| 6,371,455 B1 | 4/2002 | Lee et al. | |
| 6,588,735 B2 | 7/2003 | Bosmans et al. | |
| 6,746,003 B2 * | 6/2004 | Lee et al. | 261/114.1 |
| 6,817,596 B2 | 11/2004 | Fischer | |
| 6,948,705 B2 * | 9/2005 | Lee et al. | 261/79.2 |
| 7,648,128 B2 * | 1/2010 | Lee et al. | 261/114.1 |
| 7,753,348 B2 * | 7/2010 | Lee et al. | 261/114.1 |
| 2006/0169573 A1 * | 8/2006 | Lee et al. | 202/158 |
| 2007/0145611 A1 | 6/2007 | Lee et al. | |

FOREIGN PATENT DOCUMENTS

| | | |
|---|---|---|
| GB | 1065554 | 4/1967 |

OTHER PUBLICATIONS

Chen, Gilbert, "Packed column internals", *Chemical Engineering*, Mar. 5, 1984, pp. 40-51.

Lockett, M. J., Distillation tray fundamentals, Cambridge University Press, Cambridge, England, c. 1986, pp. 178-186.

Wankat, Phillip C., "Equilibrium Staged Separations", Elsevier, NY, c. 1988, pp. 372-379.

Kister, Henry Z., "Distillation Design", McGraw-Hill Inc., 1992, pp. 382-389.

Wijn, E. F., "The effect of downcomer layout pattern on tray efficiency", pub. *The Chemical Engineering Journal*, vol. 63, Jan. 30, 1996, pp. 167-180.

Stichlmair, Johann G., at al., "Distillation: Principles and Practice", Wiley-VCH, NY, c. 1998, pp. 386-389.

UOP, Brochure entitled "Trays for Distillation, Absorption, Stripping and Extraction" (undated).

* cited by examiner

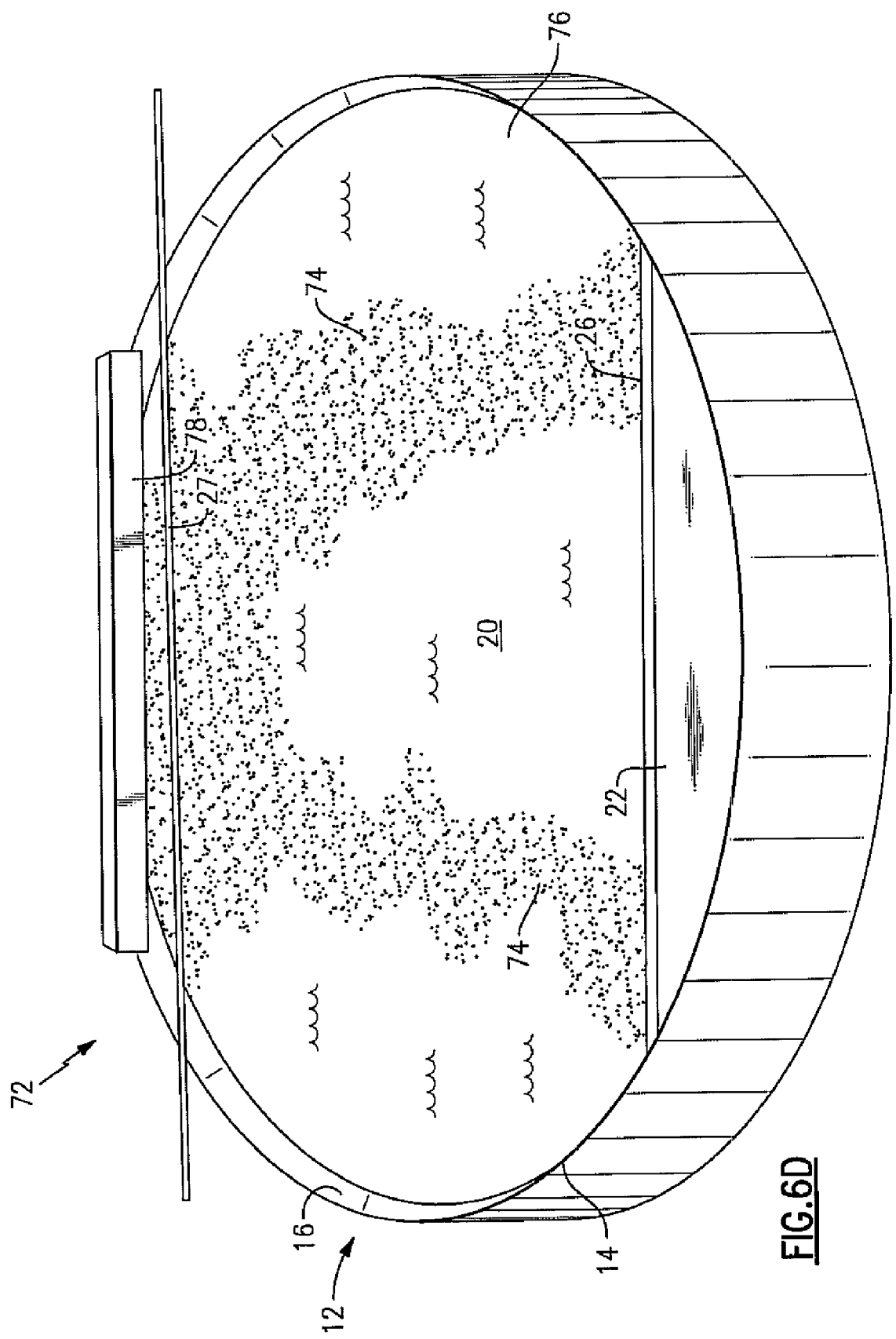

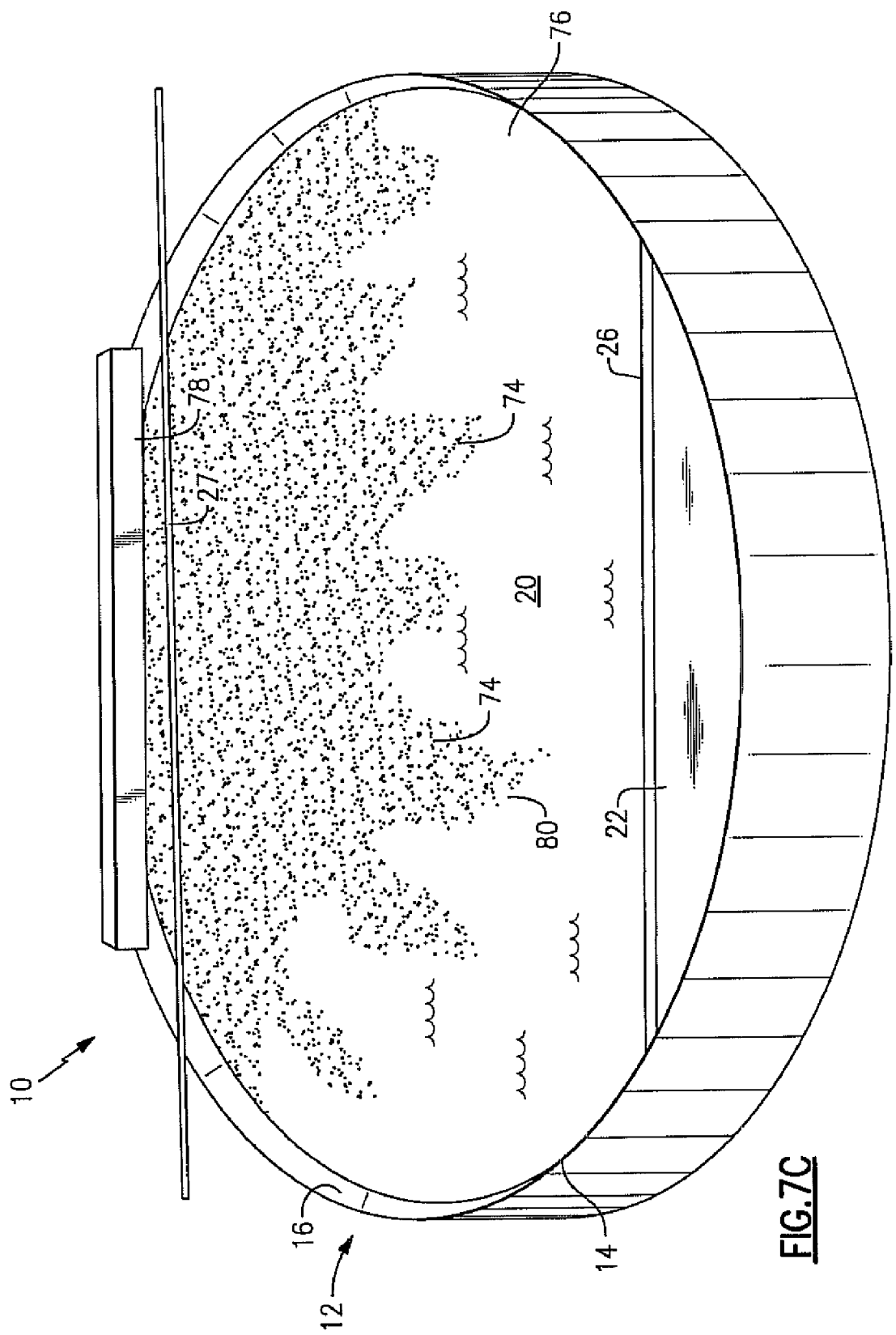

DOWNCOMER DISTRIBUTOR

FIELD OF THE INVENTION

The present invention relates to distillation trays for use in chemical process towers.

BACKGROUND

Several tray designs are known for gas-liquid contactors used in processes including reactions and separations. In each design, trays are situated within the towers for contact between the components of mixtures within the towers. Several tray designs are known, as described by, for example, Philip C. Wankat in "Equilibrium Staged Separations" published by Elsevier (1988), C. Judson King in "Separation Processes" published by McGraw-Hill Book Company ($2^{nd}$ edition, 1980), Henry Z. Kister in "Distillation Design" published by McGraw-Hill, Inc. (1992), and Johann G. Stichlmair and James R. Fair in "Distillation: Principles and Practice" published by Wiley-VCH (1998). It is also known that the downcomer layout pattern affects tray efficiency, as described by Wijn, E. F. in "The effect of downcomer layout pattern on tray efficiency" published in The Chemical Engineering Journal, vol. 63, pages 167-180 (1996).

Chemical process towers are designed for performance of a variety of processes, as illustrated in commercial literature available from tower manufacturers such as "Trays for Distillation, Absorption, Stripping and Extraction" published by UOP.

Several tray designs have been invented, of which the following are representative examples: U.S. Pat. No. 3,729,179 (1973) issued to Keller; U.S. Pat. No. 3,747,905 (1973) issued to Nutter et al.; U.S. Pat. No. 5,269,976 (1993) issued to Biddulph et al.; U.S. Pat. No. 5,453,222 (1995) issued to Lee et al.; U.S. Pat. No. 6,371,455 (2002) issued to Lee et al.; and U.S. Pat. No. 6,817,596 (2004) issued to Fischer.

SUMMARY

The tray assembly described herein relates to an improved design for trays within a chemical process tower. The downcomers of the trays include a distributor subtending therebelow. The distributor includes a series of discharge ports and associated flanges. The discharge ports are sized so as to control the rate of liquid flow at different positions across the distributor. The flanges are aligned individually to direct the liquid flow across different areas of the tray deck immediately below. In combination, the discharge ports and liquid flow directing flanges effect more even liquid flow across the surface of the tray immediately below, thereby avoiding the formation of stagnant regions. The net result is that there is higher tray capacity and efficiency when compared with prior art trays.

There is therefore provided a tray for a gas/liquid contact column. The tray includes a tray deck, an inlet distribution area, and a downcomer. The downcomer includes an angled portion, the angled portion extending downward relative to the tray deck at an angle between 0 degrees and 90 degrees, and terminating in a distributor region. The distributor region has a series of discharge ports formed in the angled portion, each discharge port having more than one side. At least one side has a flange that extends below the discharge port, such that fluid flowing down the downcomer is distributed as it flows through the distributor region.

DESCRIPTION OF THE DRAWINGS

These and other features will become more apparent from the following description in which reference is made to the appended drawings, the drawings are for the purpose of illustration only and are not intended to be in any way limiting, wherein:

FIG. 6A through 6E is a series of perspective drawings showing the pattern of flow over the deck of a tray having a sweptback downcomer at 0 seconds, 10 seconds, 20 seconds, 40 seconds, and 60 seconds after injection of the dye into the liquid at the inlet, respectively.

FIG. 7A through 7E is a series of perspective drawings showing the pattern of flow over the deck of a tray having a downcomer and a distributor at 0 seconds, 10 seconds, 20 seconds, 40 seconds, and 60 seconds after injection of the dye into the liquid at the inlet, respectively.

DETAILED DESCRIPTION

Figure 1:
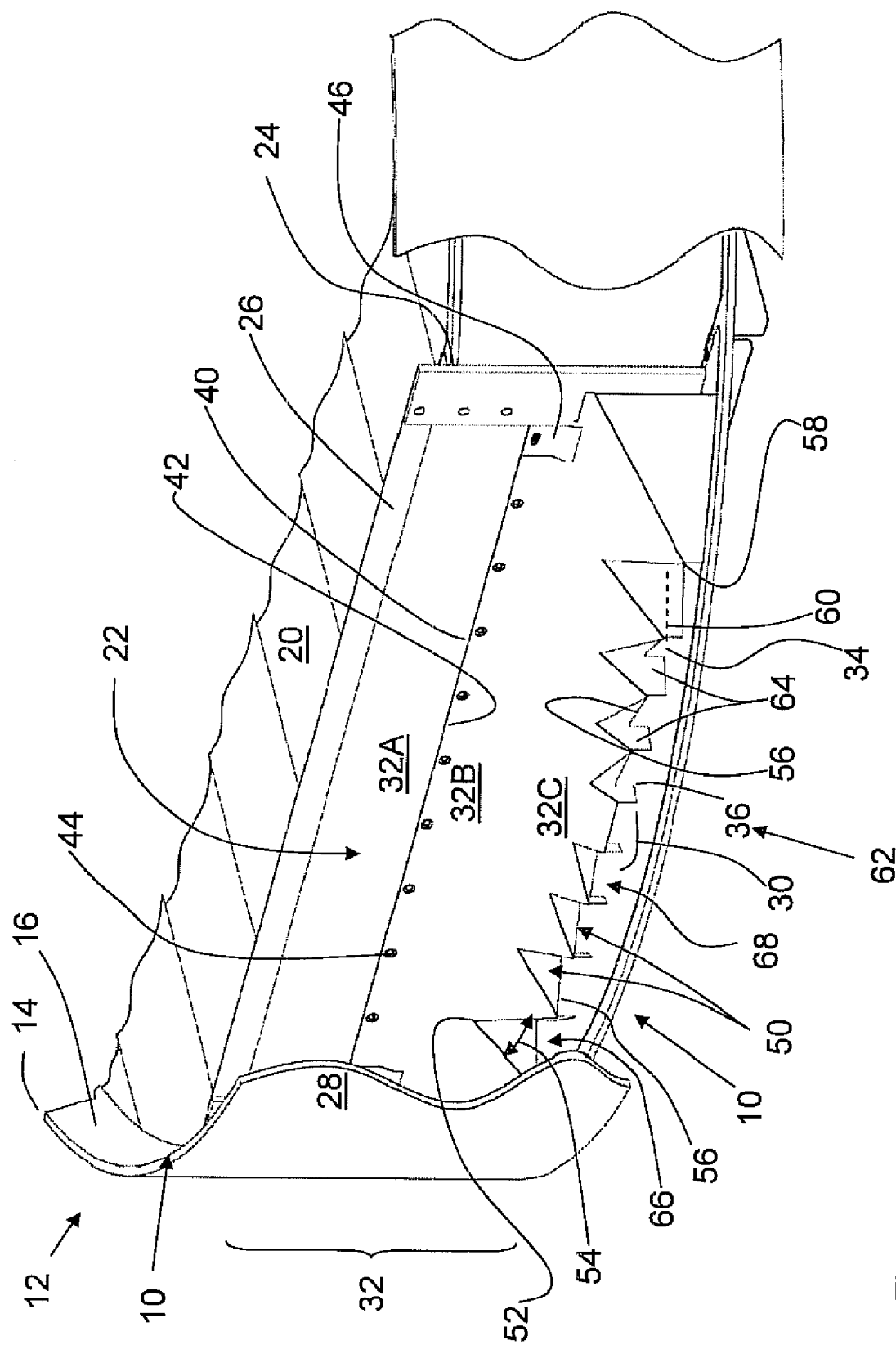
FIG. 1 is a cut-away perspective view of a portion of a tower having a tray fitted therein, showing at an angle the face of a downcomer having a distributor.

In the discussion below, a tray used for gas-liquid contact such as for use in distillation is discussed. The downcomer of the tray includes a distributor. The downcomer distributor has a series of discharge ports and liquid flow directing flanges, the combination of which provides a relatively even flow across the tray immediately below the downcomer. This reduces the maldistribution present in other designs, which in turn improves the efficiency of gas-liquid contact on the tray.

A tray assembly, generally identified by reference numeral 10, will now be described with reference to FIG. 1 through FIG. 7.

Referring to FIG. 1, a tray assembly 10 for gas/liquid contact is installed in a chemical process tower, shown in cut-away and identified by reference numeral 12, having walls 14 with an inner surface 16, within which tray assemblies 10 can be affixed. Tray 10 has a tray deck 20, which may comprise either one or several portions, and at least one first downcomer 22 at an edge 24 of deck 20. Preferably, tray 10 has an outlet weir 26 to maintain a depth of a liquid 76 (shown in FIG. 5 through 7) above deck 20, and, optionally, an inlet weir 27 (shown in FIG. 5 through 7) adjacent an inlet distribution area 30.

Figure 2:
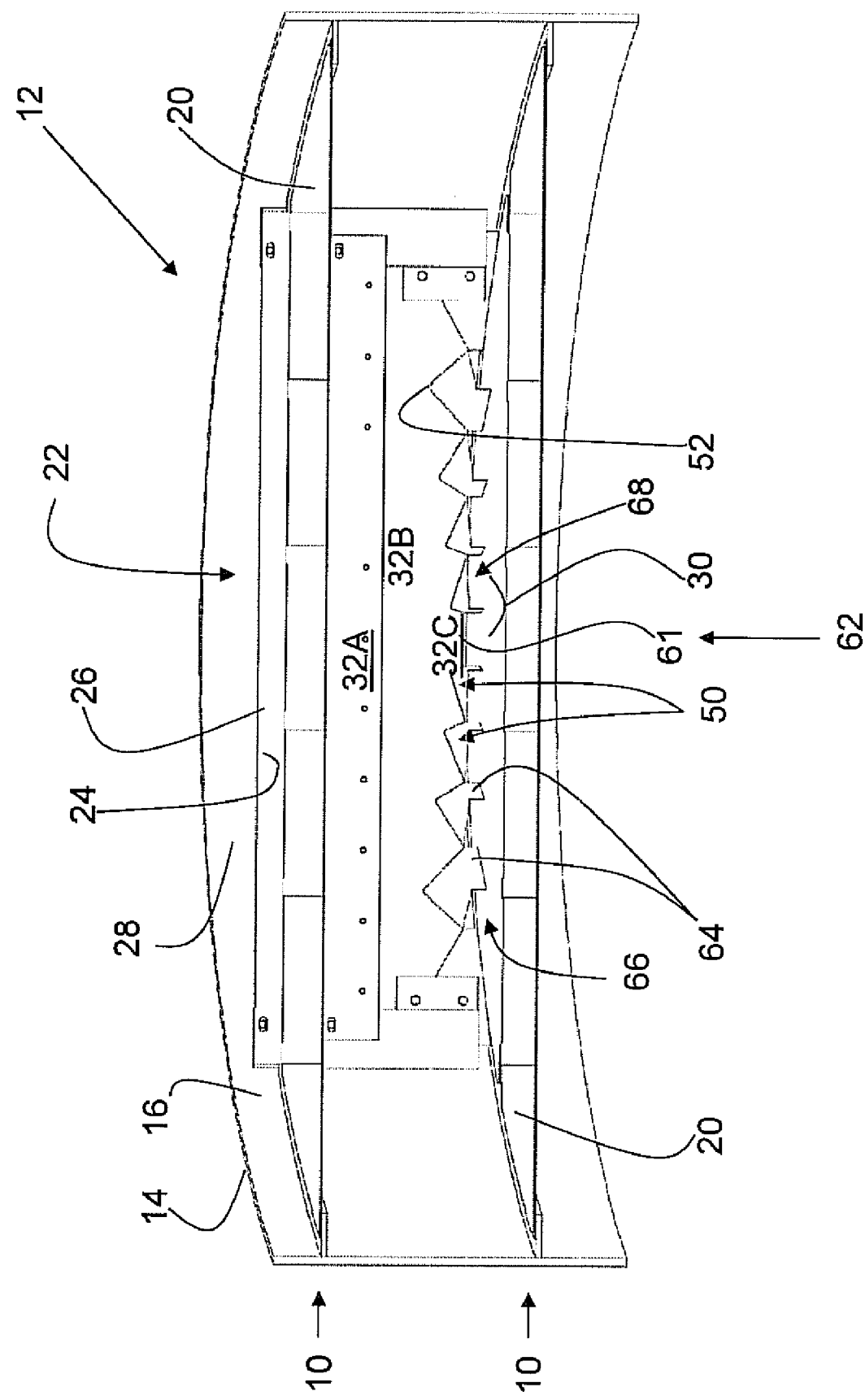
FIG. 2 is a cut-away perspective view of a portion of a tower having a tray fitted therein shown in FIG. 1, showing a back view of the downcomer and distributor.

Referring to FIG. 2, a plurality of trays 10 are situated within tower 12. Trays 10 are mutually oriented so that an outlet downcomer 22 of an upper tray 10 is situated above inlet receiving area 30 of the immediately lower tray 10.

FIG. 1 through 4 illustrate an embodiment of tray 10 having an unportioned tray deck 20 extending from inlet distribution area 30 to edge 24 and exit downcomer 22. It will be recognized that the architecture of tray 10 may include a plurality of downcomers 22 interposed between a plurality of portions of deck 20.

In the architecture of embodiment 10 shown in FIGS. 1 and 2, downcomer 22 is adjacent inner surface 16 of walls 14 of tower 12, and is bounded on one side by a portion 28 of inner surface 16 of walls 14, and on the other side by a downcomer wall 32.

Downcomer wall 32 extends downward across the length of edge 24 of deck 20 toward inlet receiving area 30 of another deck 20 immediately below. There is a gap 34 between a bottom edge 36 (downcomer bottom chord) of downcomer wall 32 and the lower tray deck 20, gap 34 extending along all or the majority of the length of first downcomer wall 32.

Referring to FIG. 2, downcomer wall 32 has a first portion 32A, a second portion 32B, and a third portion that is a distributor 32C. First portion 32A is affixed to deck 20 at edge 24. Referring to FIG. 1, a top 40 of portion 32B is affixed to a bottom 42 of portion 32A. As shown, distributor 32C comprises a lower section of the same component part as second portion 32B that is cut and shaped to form the shape of distributor 32C. Attachments between deck 20, first portion 32A and second portion 32B are shown as screws or rivets 44, augmented by flanges 46. It will be recognized that alternative methods of construction may be used, such as welding together of portions, and that individual portions 32A, 32B and 32C and combinations thereof may be constructed from one or more component materials.

It has been found through experiment that the illustrated embodiment provides a more even flow across deck 20 than prior art gas-liquid contactor architectures, as will be demonstrated with reference to FIG. 5 through 7. It will be understood that the specific architecture and dimensions given are specific to the depicted example, and those skilled in the art will understand that modifications may be made to achieve beneficial results.

Referring to FIG. 1, distributor 32C has a substantially vertical first portion 32A of downcomer wall 32. It has been found through experiment that the performance of tray 10 is improved when second portion 32B is sloped in a direction away from deck 20 and toward portion 28 of walls 14. For ease of manufacture and for good performance of tray 10, distributor 32C may be constructed and oriented as an extension at the same angle as second portion 32B, however the angle of distributor 32C may be different from that of second portion 32B.

Figure 4:
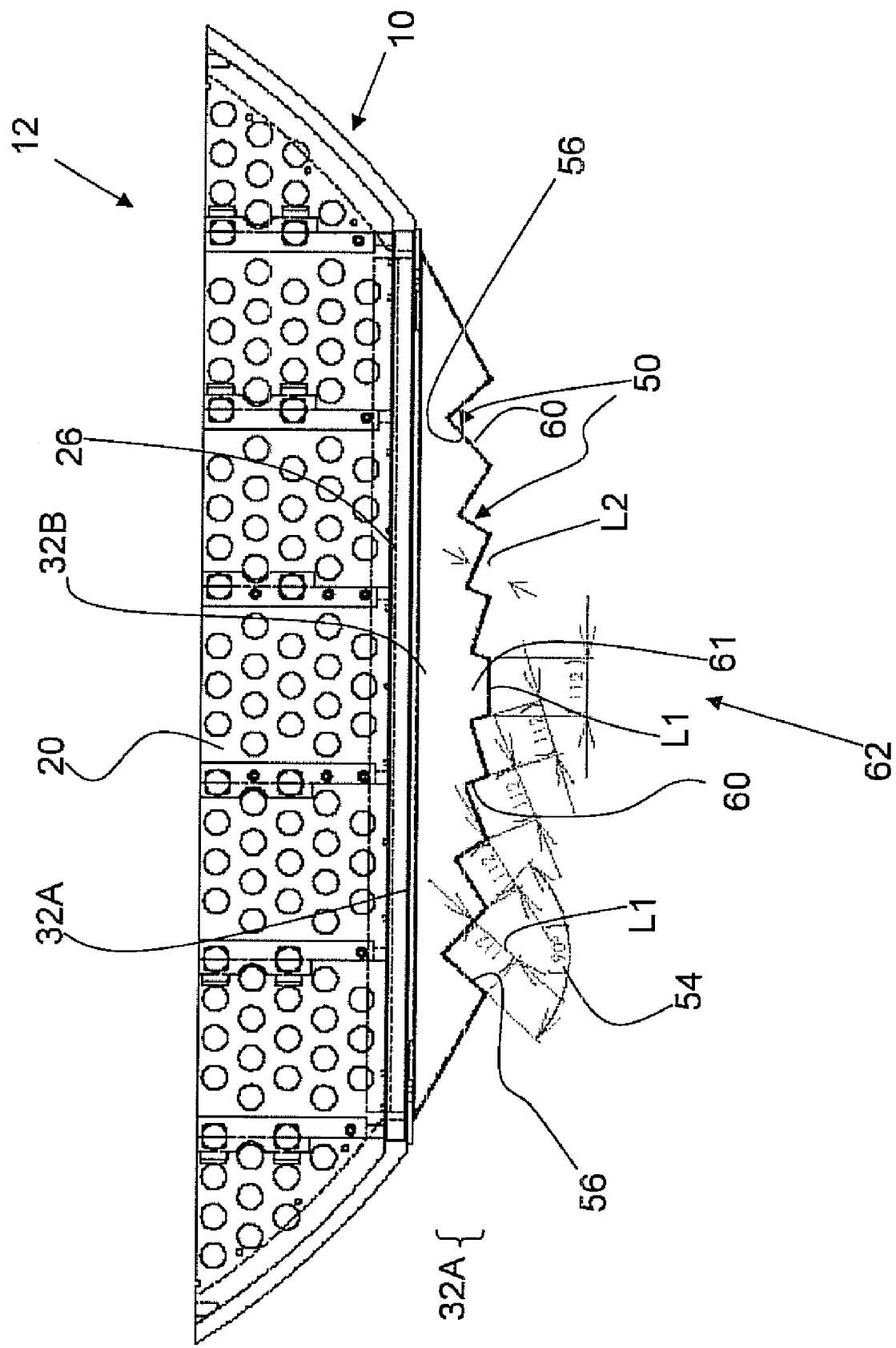
FIG. 4 is a top view of a portion of a tray, showing a combination of the tray deck, downcomer and distributor.
Figure 5A:
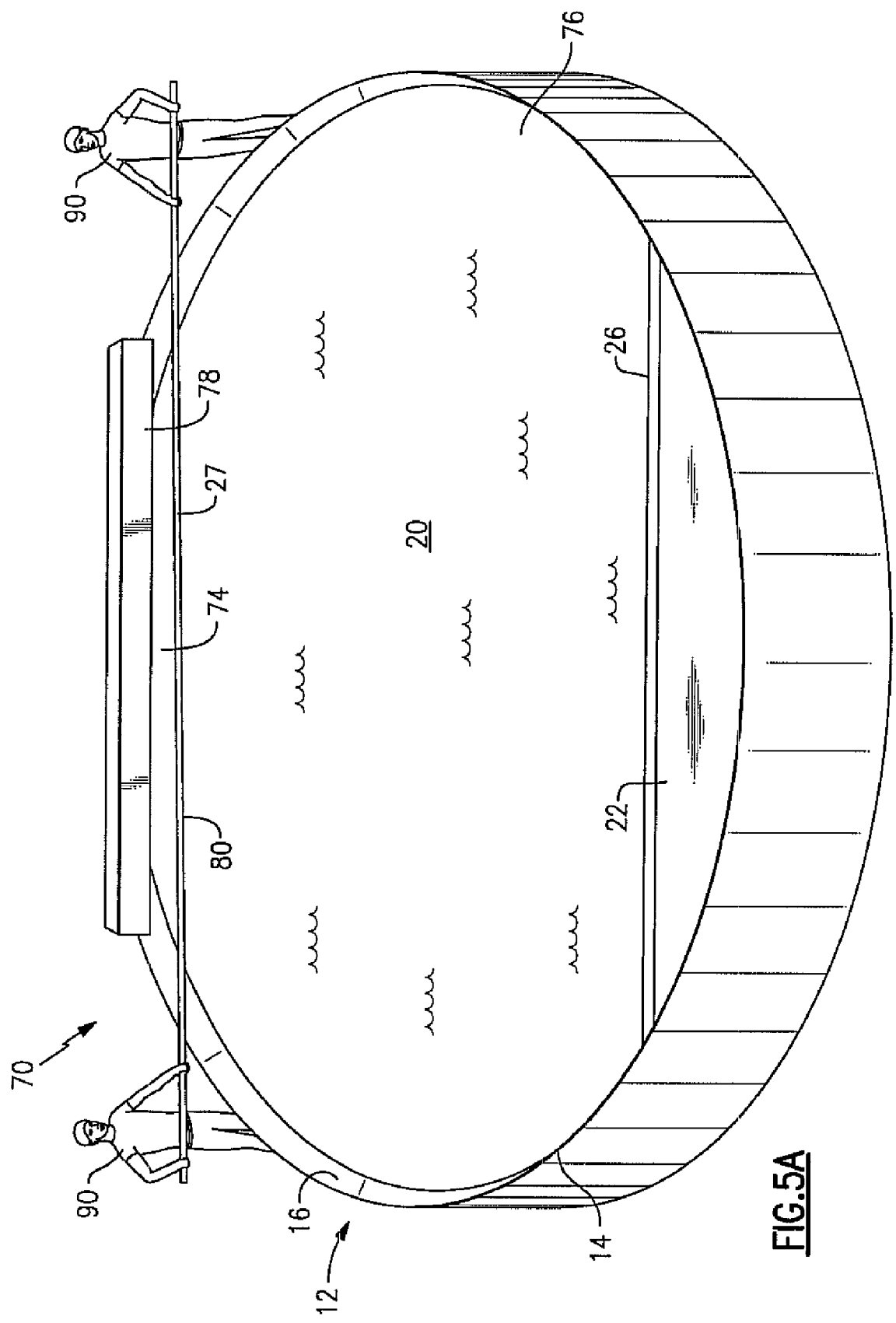
FIG. 5A through 5E is a series of perspective drawings showing the pattern of flow over the deck of a tray having a straight downcomer at 0 seconds, 10 seconds, 20 seconds, 40 seconds, and 60 seconds after injection of the dye into the liquid at the inlet, respectively.
Figure 5B:
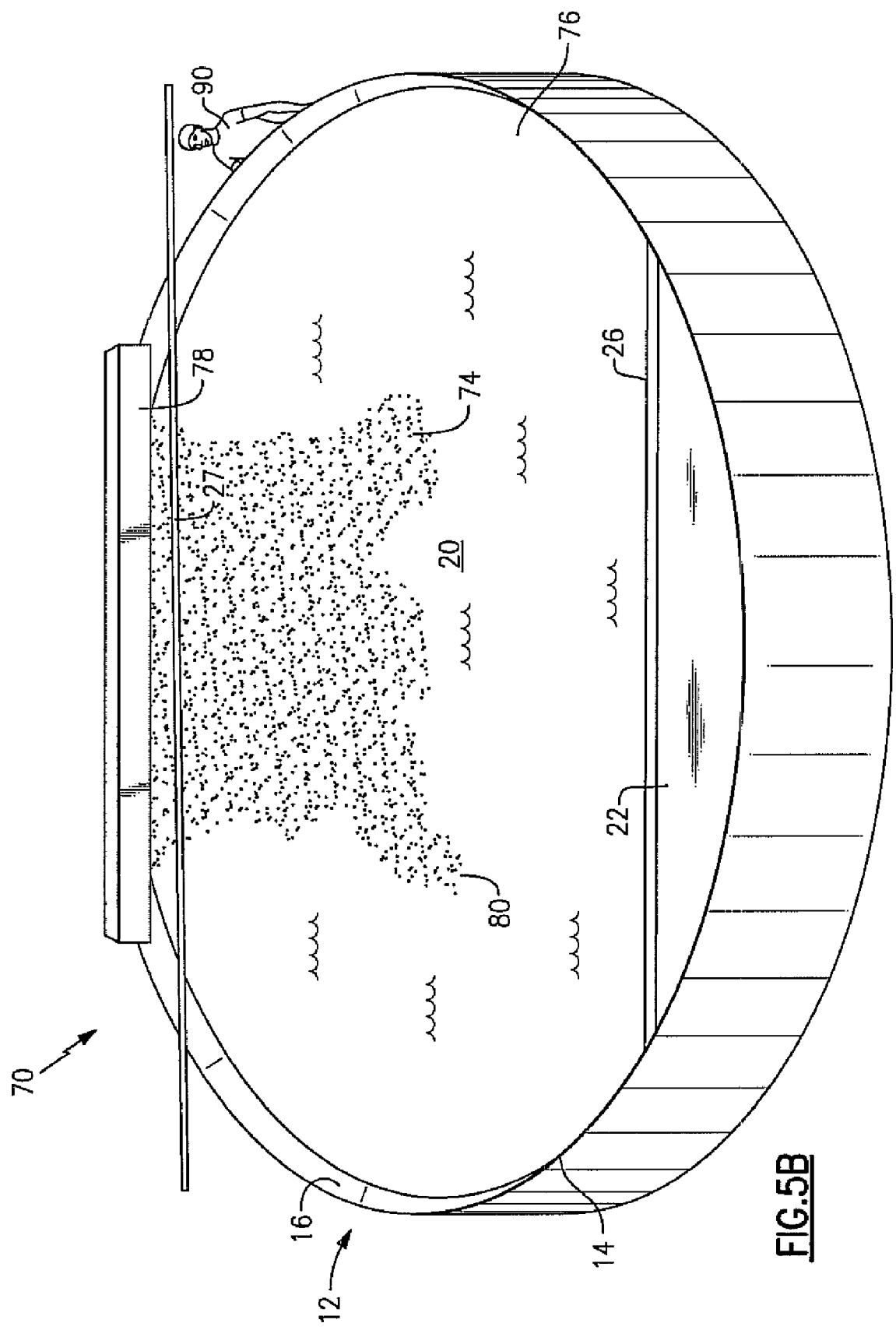
Figure 5C:
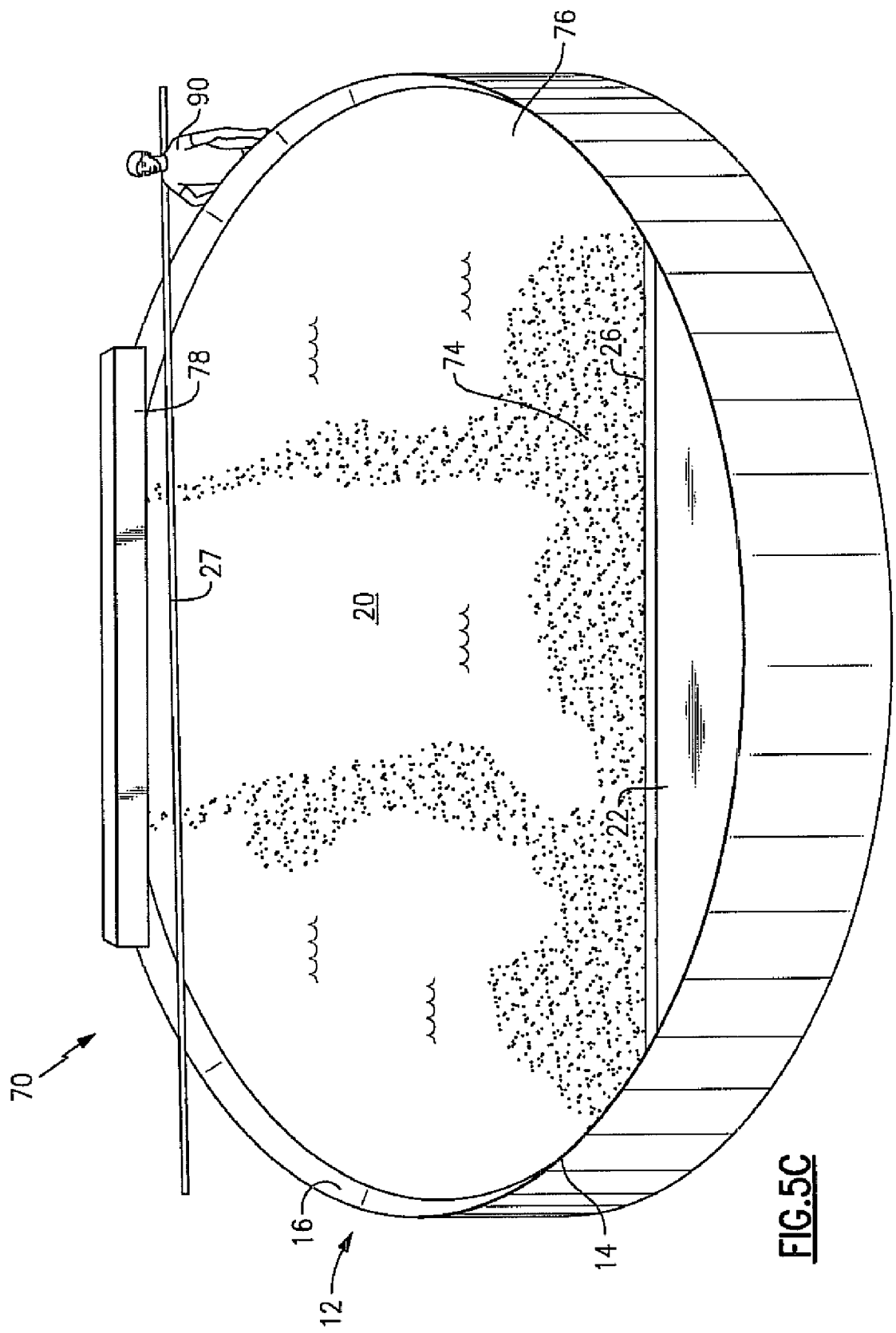
Figure 5D:
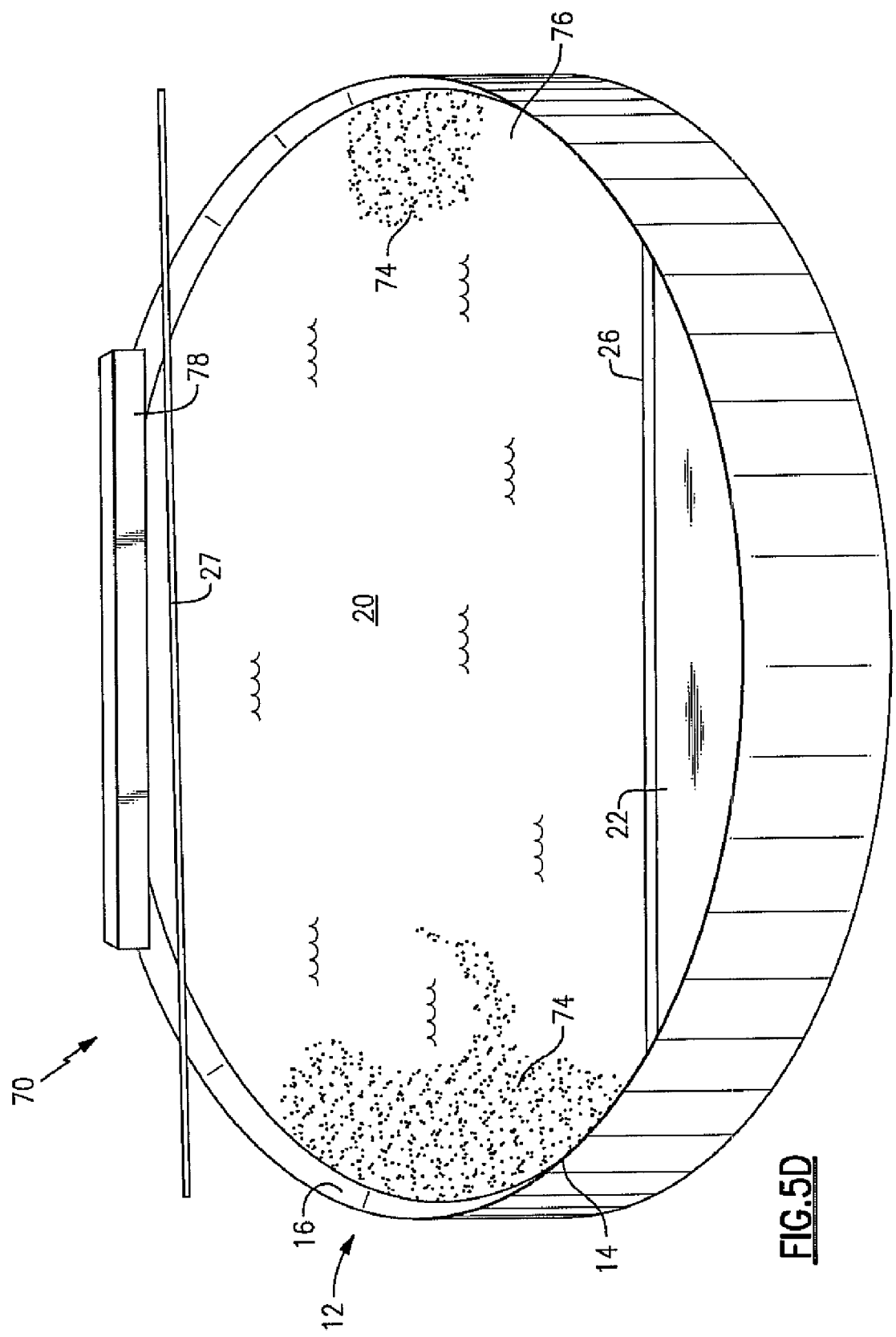
Figure 5E:
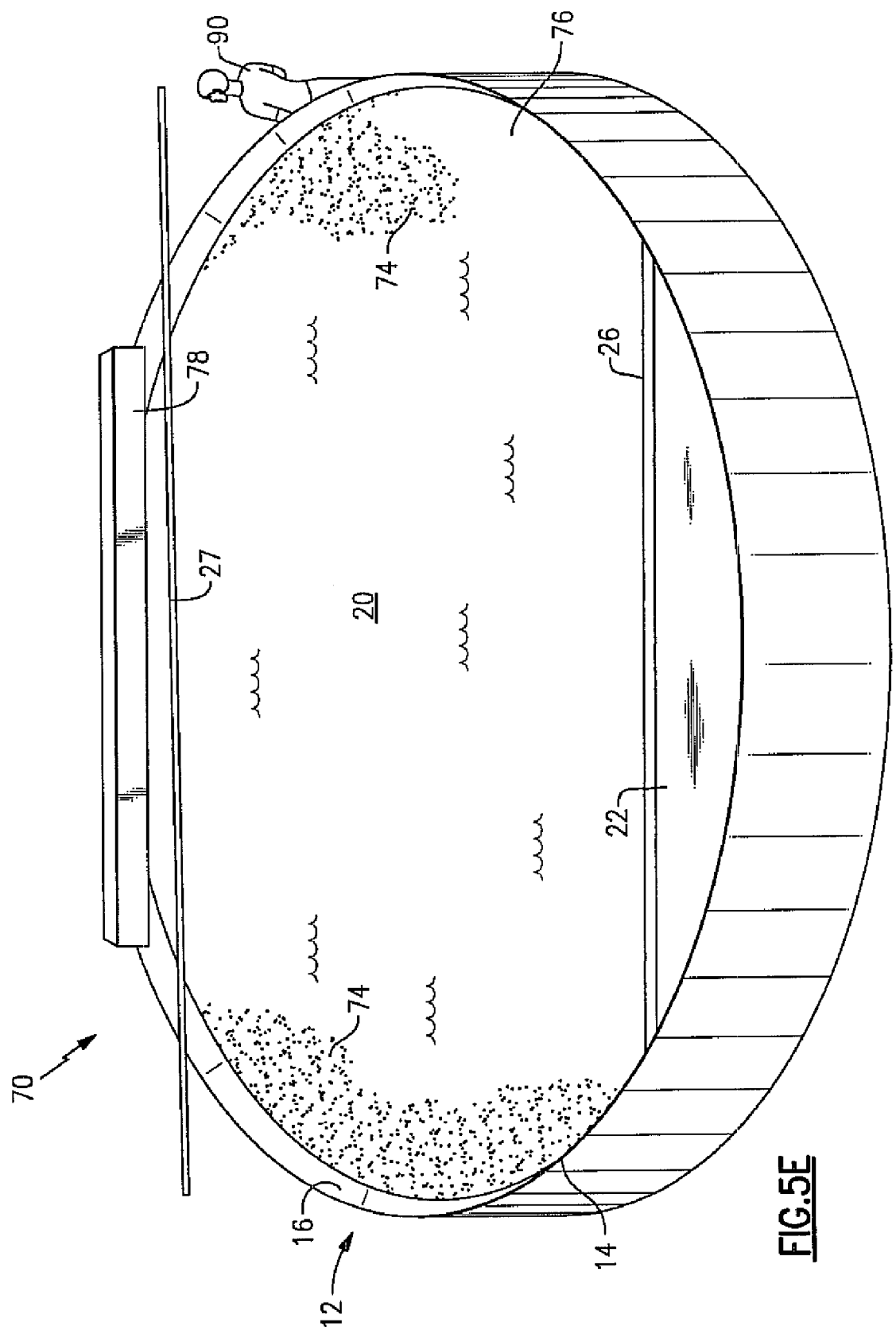
Figure 6A:
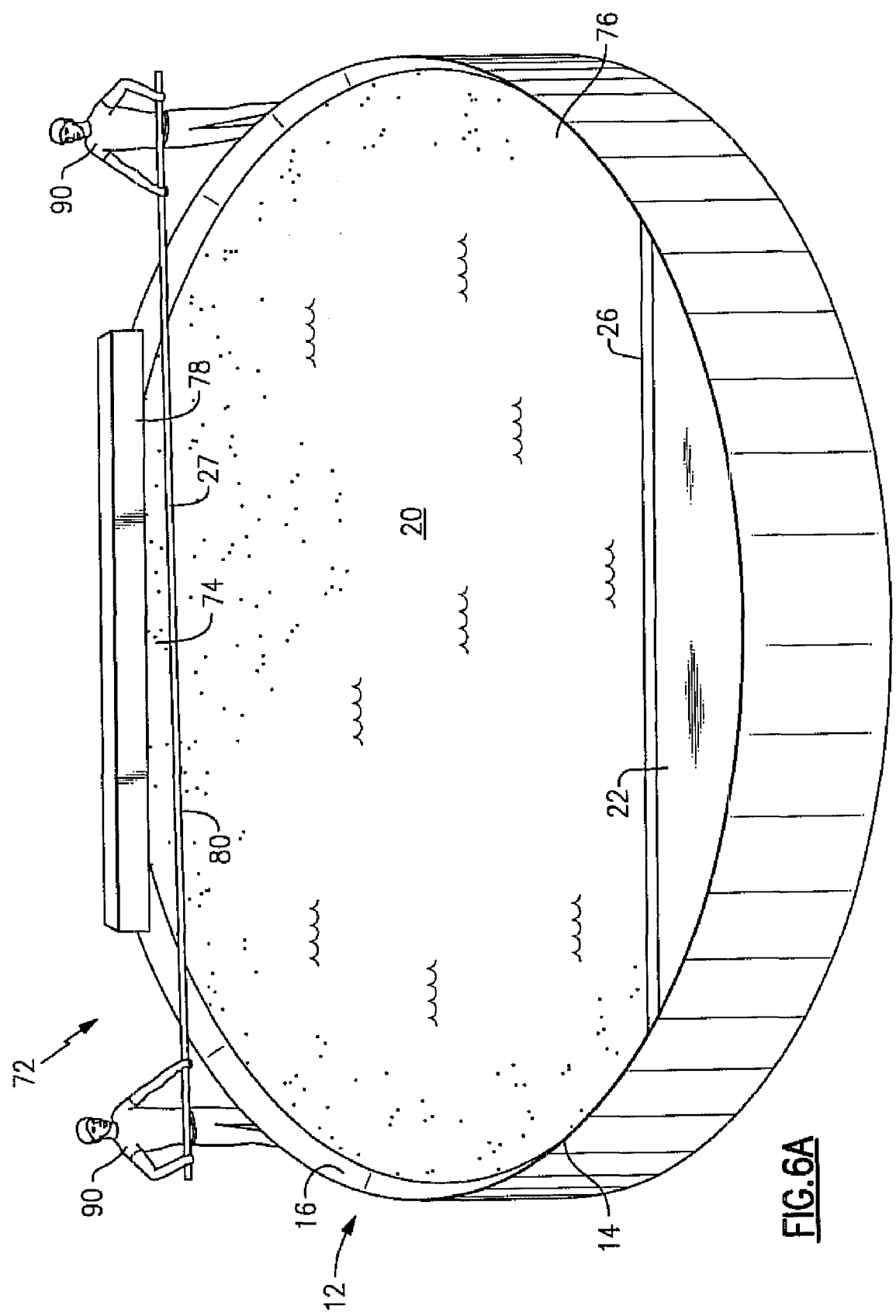
Figure 6B:
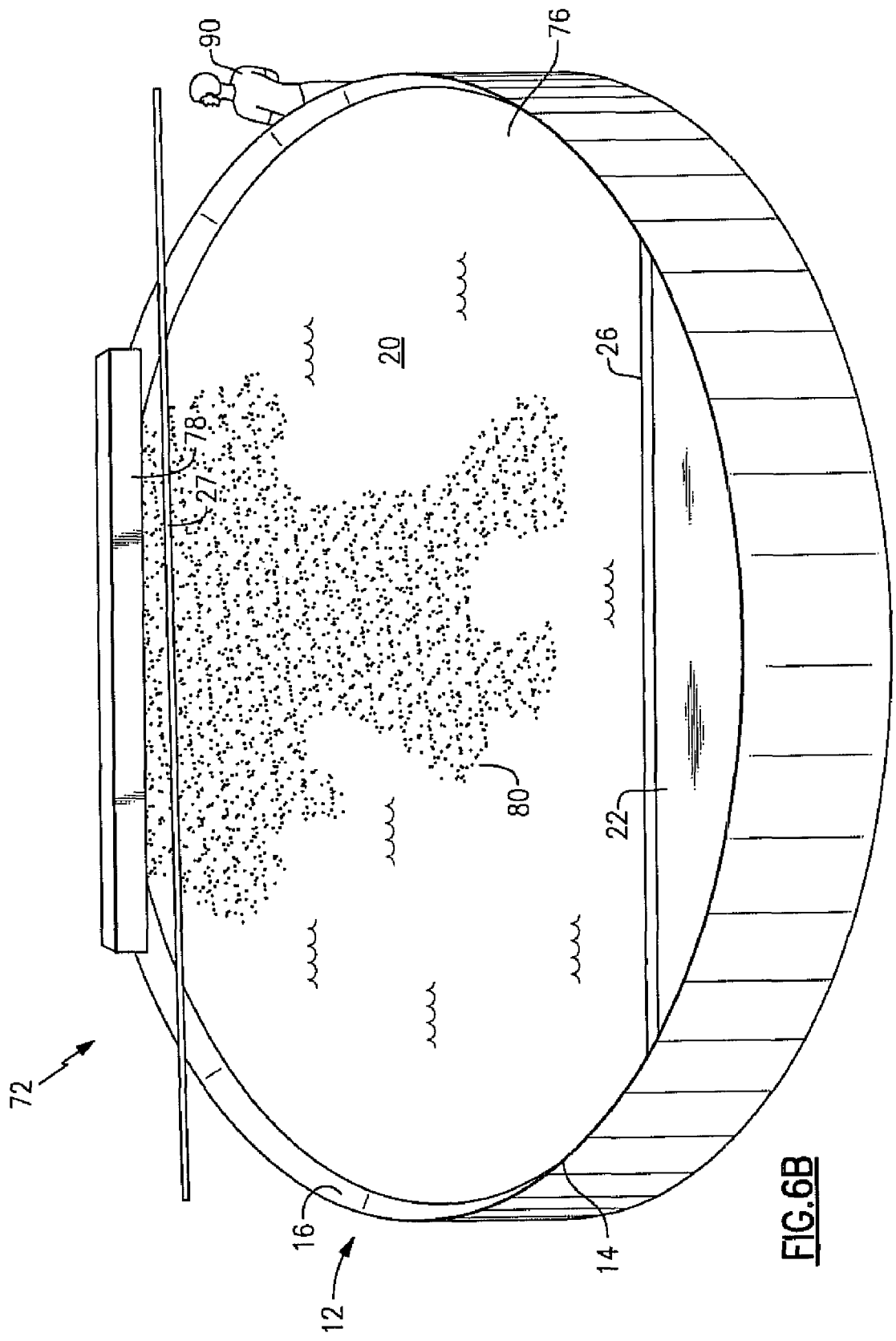
Figure 6C:
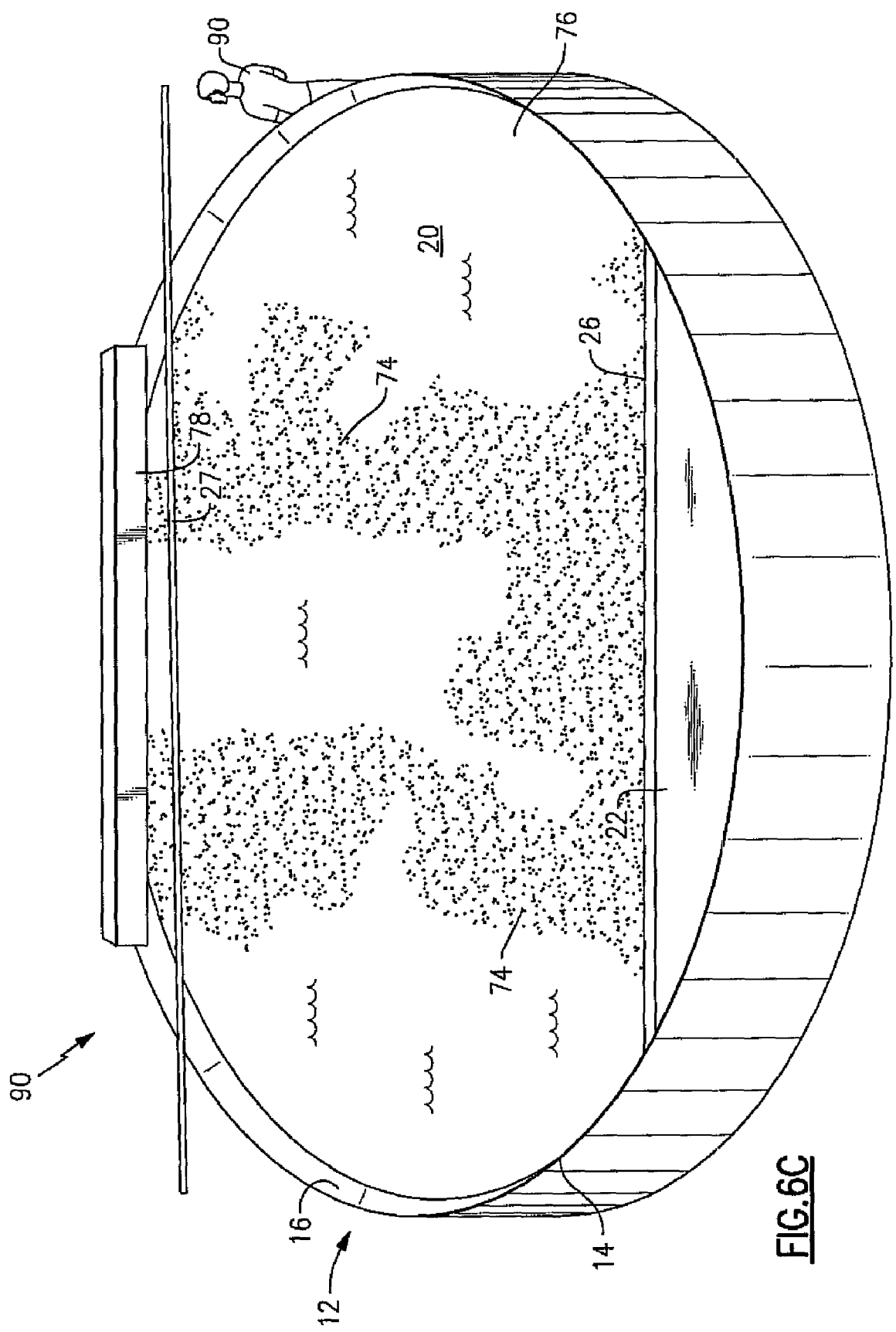
Figure 6E:
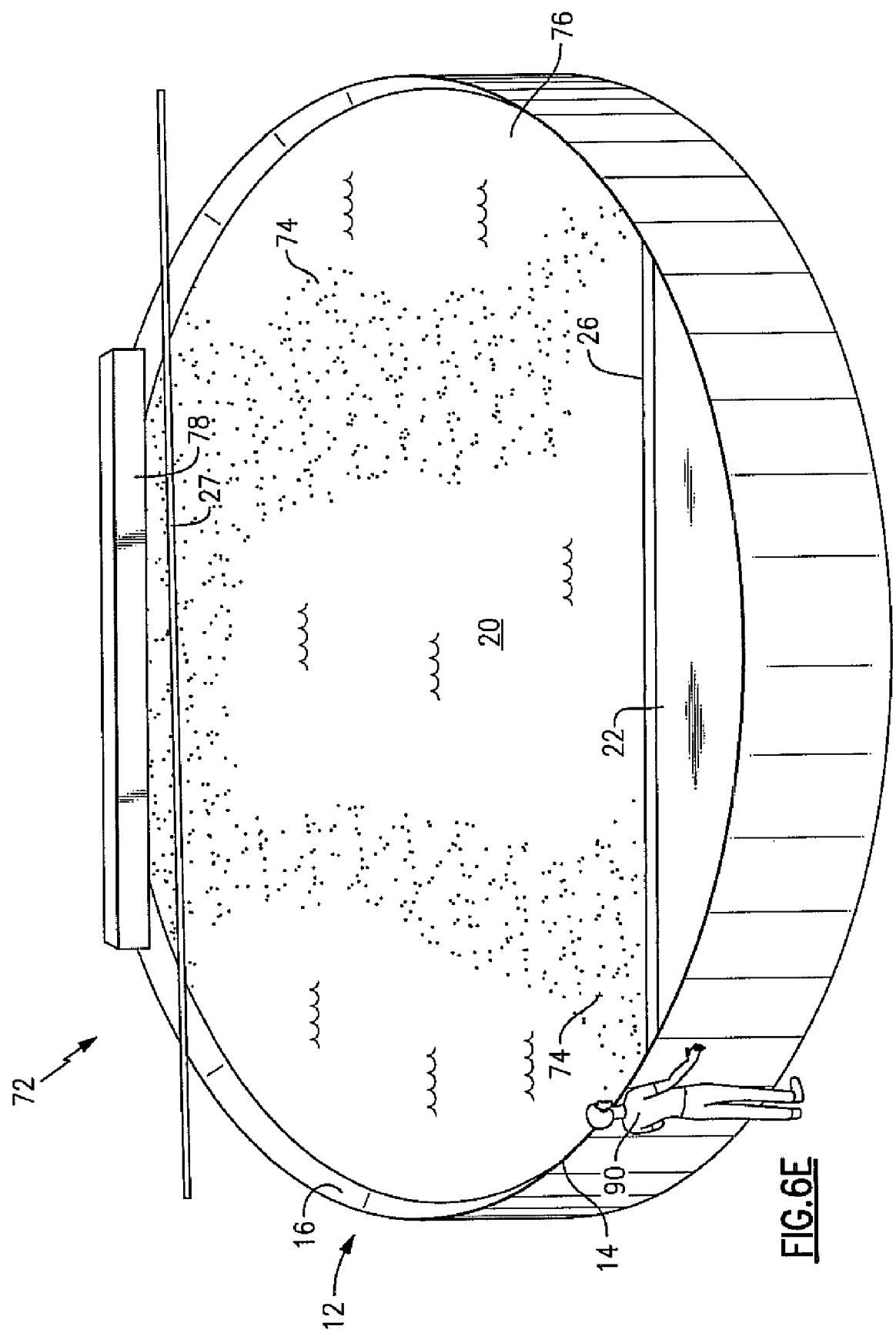

Referring to FIG. 4, distributor 32C has a series of discharge ports 50. Discharge ports 50 are V-shaped notches, and have a right-angled apex 52. It will be recognized that V-shaped discharge ports 50 may have a different apex angle 54, and that discharge ports 50 may have different shapes without diverging from the principles and purposes of the present invention. Discharge ports 50 have an outer lower edge 56 toward the ends 58 of distributor 32C, and an inner lower edge 60 toward the center 62 of distributor 32C. A flange 64 extends downward from inner lower edge 60 of discharge ports 50.

Figure 3:
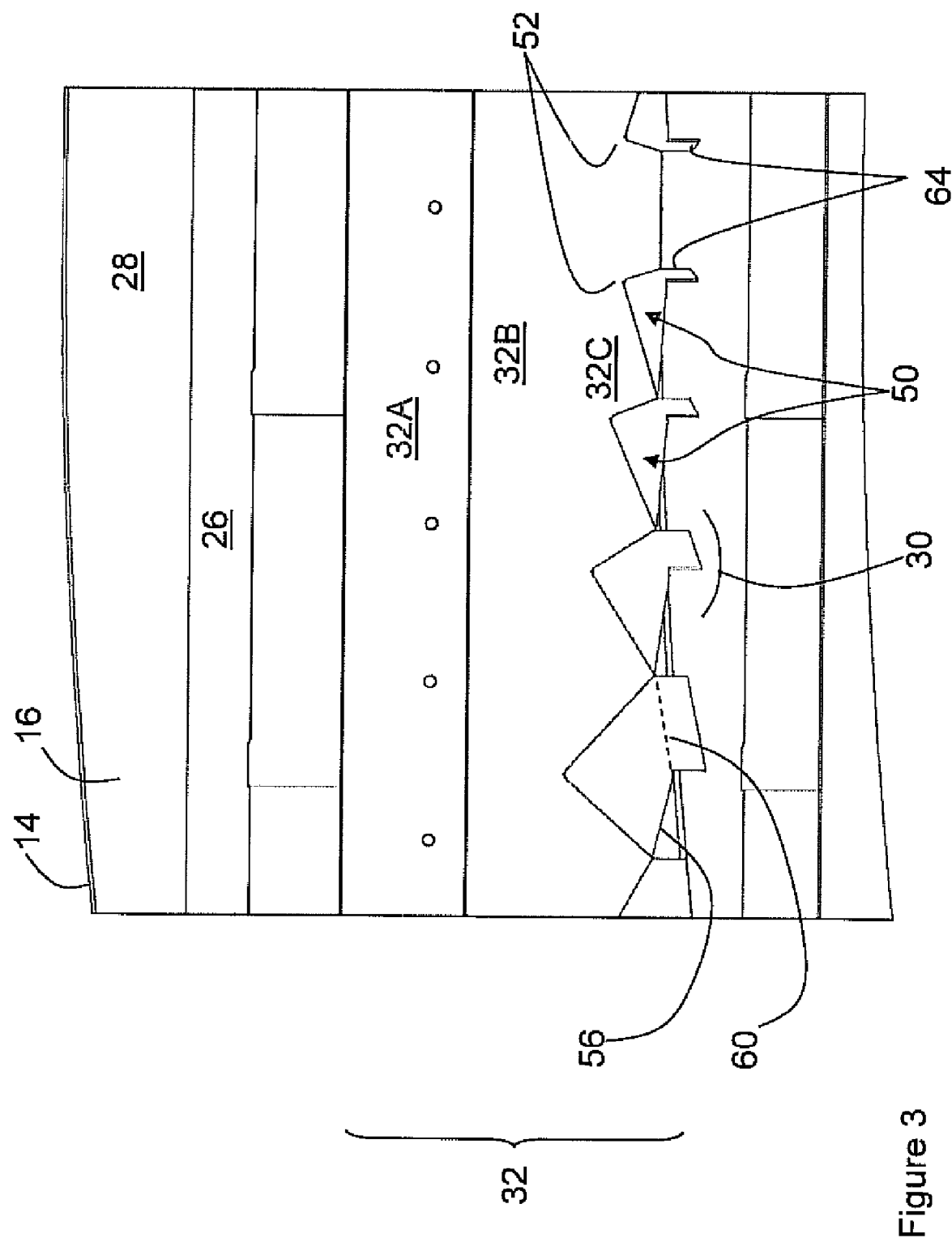
FIG. 3 is a close-up view of the face of a downcomer and distributor shown in FIGS. 1 and 2.

Referring to FIG. 3, the combination of the sizes of each discharge port 50 and the different orientations of each flange 64 are such that the volumetric liquid flow is controlled and directed so that the area distribution of the volumetric liquid flow across tray deck 20 is very even. The angles of flanges 64 and the size of gap 34, which is small when the bottom 36 of flanges 64 is proximate to deck 20 of the other tray 10 immediately below, are such that liquid flowing downward over distributor 32C is then directed in different directions across the deck 20 immediately below inlet downcomer 22. Referring to FIG. 1, outer discharge ports 66 and associated flanges 64 direct liquid flow across portions of deck 20 adjacent walls 14. Inner discharge ports 68 and associated flanges 64 direct liquid flow across central portions of deck 20. Intermediate discharge ports and flanges direct liquid flow in directions intermediate between the inner and outer flows. As will be shown in FIG. 7, there is lateral mixing between the directed liquid flows.

FIG. 4 shows the geometry for one embodiment of distributor 32C of tray 10, shown experimentally to be effective for generating even distribution of liquid flow across a tray deck immediately below distributor 32C. In this embodiment, discharge ports 50 are V-notches of which the angle 54 at each apex 52 is the same and is a right-angle. V-notch discharge port apex angle 54 may have a value ranging from about 60 degrees to about 120 degrees, with an angle of 90 degrees being shown. The outer lower edge 56 of each discharge port 50 has the same length L1, such as 112 mm. As shown the length of the straight central portion 61 of distributor 32C is also L1. While the illustrated relative dimensions have been shown to be effective, it is not necessary that the length of central portion 61 is the same as that of lower outer edge 56, nor is it necessary that all lower edges 56 have identical lengths. Furthermore, other lengths and angles may also provide satisfactory results. The angles from the centerline of deck 20 of outer lower edge 56 and inner lower edge 60, and the length L2 of the inner lower edge 60 of each discharge port 50 vary progressively according to the position of the respective discharge port 50, and so the orientations of the corresponding flanges 64 also are varied progressively. The angle of inner lower edges 60 from the centerline of deck 20 is greatest for those discharge ports 50 closest to walls 14, and decreases progressively for discharge ports toward central portion 61.

When downward liquid flow is evenly distributed across the width of inlet downcomer 22, the relative sizes of discharge ports 50 determine the relative flow rates through those discharge ports 50. The directions of the different flows from each discharge port 50 are directed by flanges 64. In this manner, liquid flow is distributed evenly across all of deck 20 by the combination of sizes of discharge ports 50 and orientations of flanges 64. The efficacy of this architecture will be illustrated with reference to FIG. 7A through 7E, and compared with that of prior art downcomers with reference also to FIG. 5A through 5E and 6A through 6E.

It will be recognized that the number of discharge ports 50 can be different from that show in FIG. 1 through 4, in which cases the sizes of said discharge ports 50 will also be varied in a different systematic manner.

Stichlmair and Fair in "Distillation: Principles and Practice" say, with reference to Lockett in "Distillation Tray Fundamentals" Cambridge University Press (1986):

"There exist several techniques for maldistribution measurement on trays. The simplest method is to suddenly inject a dye into the incoming liquid and to watch the spreading of the colored liquid across the tray by eye, e.g., [Lockett 1986]."

FIG. 5A through 7E are drawings taken during progress of a series of experiments performed using two prior art tray designs, a tray having a straight downcomer 70 (FIG. 5A through 5E) and a tray having a swept-back downcomer 72 (FIG. 6A through 6E), and one embodiment of tray 10 of the present invention (FIG. 7A through 7E). The experimental data clearly show the benefit of use of trays 10 of the present invention. In each experiment the liquid flow rate was the same and continuous, and the internal diameter of the open tower 12 holding the respective tray was the same large diameter. The large size of the tower (17 feet internal diameter) can be seen by comparison with the sizes of operators 90 performing the experiments. When liquid flow was steady, a dye 74 was suddenly injected into the liquid 76 at the inlet receiving area 30 of the respective trays 70 (FIG. 5A through 5E), 72 (FIG. 6A through 6E), 10 (FIG. 7A through 7E). The progress of a front edge 80 of dye 74 across each of trays 70, 72, 10 showed the different forms taken by the distribution of liquid flow across the respective decks 20.

FIG. 5A through 5E show drawings of the experiment using tray 70, having a straight downcomer. The experiment was filmed; FIG. 5A through 5E are a sequence of still photographs at the time of injection of dye 74 (FIG. 5A), then after 10, 20, 40 and 60 seconds sequentially (FIGS. 5B through 5E). Liquid 76 containing dye 74 initially traveled in a direct path from inlet receiving area 30 below inlet 78 toward downcomer 22. After 20 seconds the liquid flow containing dye 74 reached downcomer 22 and also began to flow backward toward inlet 78 along the walls 14 of tower 12. Thus as shown also, for example, by Kister in FIG. 7.7 on page 383 of "Distillation Design," flow of liquid across tray 70 tends to follow the shortest path across tray deck 20 from the inlet downcomer toward the outlet downcomer, and so for tray 70 the dye is maldistributed. Consequently, tray efficiency is compromised by poor flow distribution.

FIG. 6A through 6E show still drawings taken at the same intervals as for FIG. 5A through 7E, for an experiment using tray 72 having a sweptback downcomer. Again, flow of liquid 76 containing dye 74 was initially directed primarily in a direction from inlet receiving area 30 below inlet 78 toward downcomer 22. The flow of the portion of liquid 76 containing dye 74 from the ends of inlet receiving area 30 appeared to travel more slowly than that from the center of inlet 78. Again, there was no significant forward flow of liquid along walls 16 and, again, there was also some backflow along walls 16, however it was lower than in the case of tray 70, as expected from prior claims that tray 72 had improved liquid distribution. Nevertheless, the liquid flow across deck 20 of tray 72 was not evenly distributed and so performance was compromised.

Figure 7A:
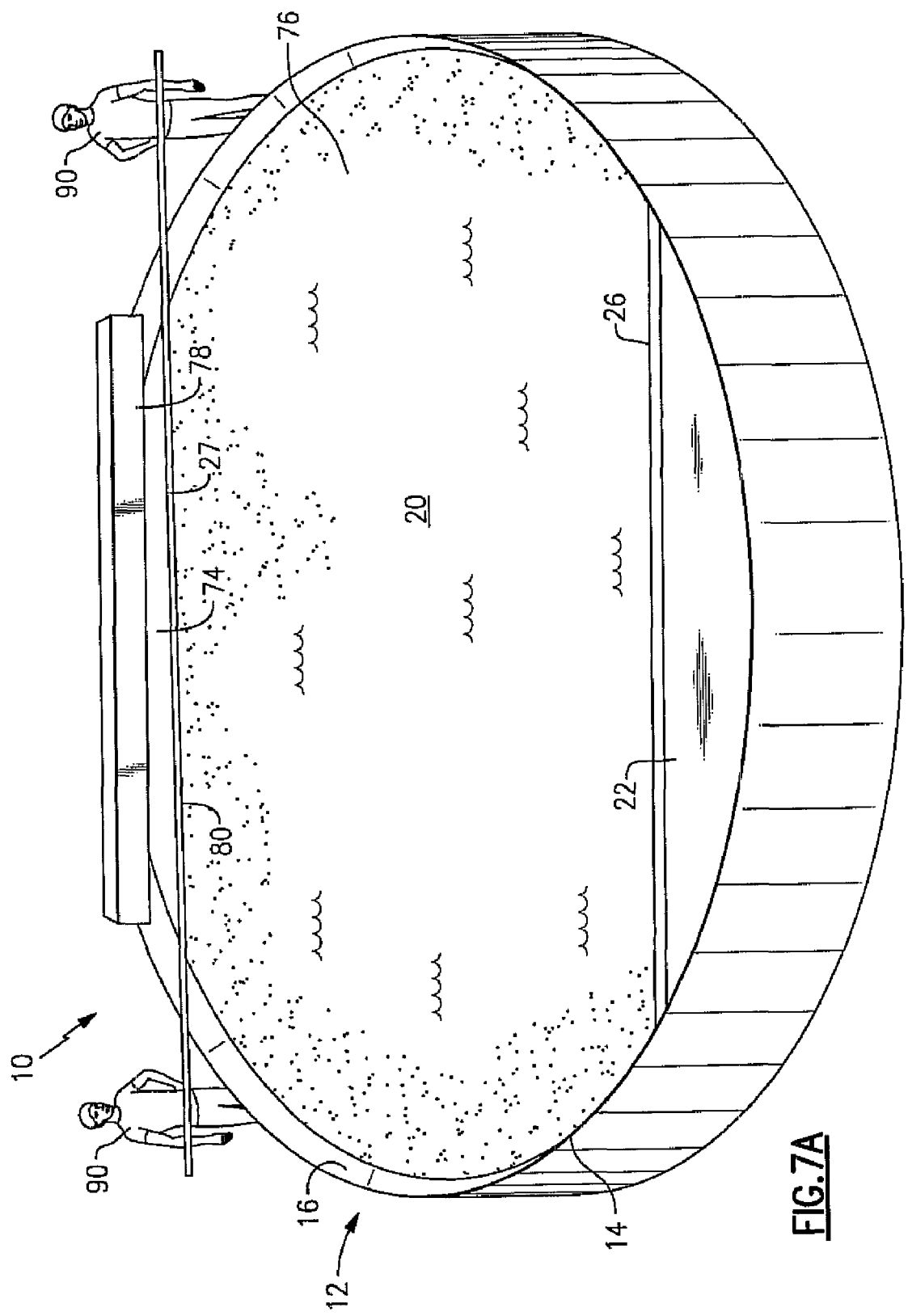
Figure 7B:
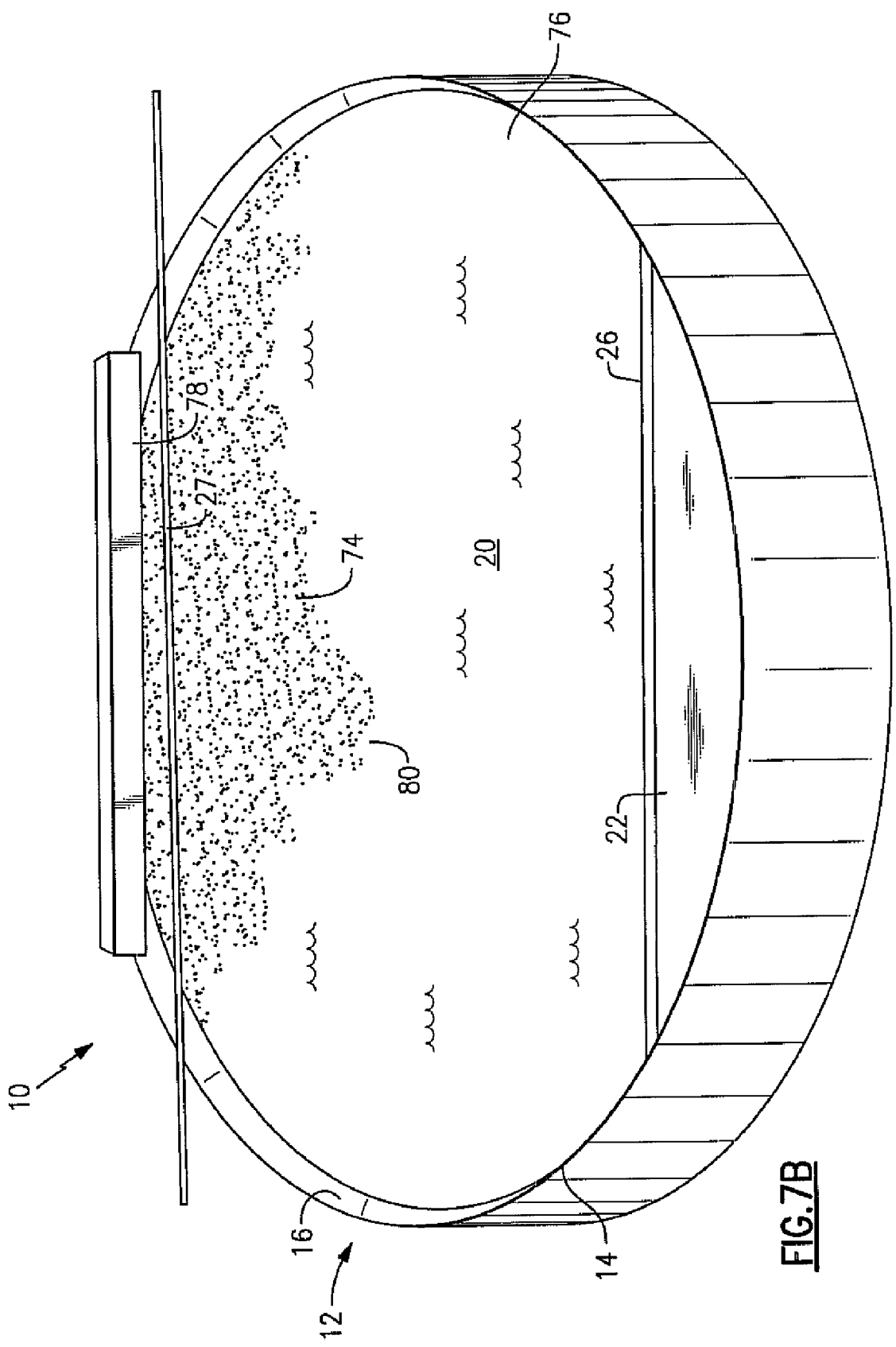
Figure 7D:
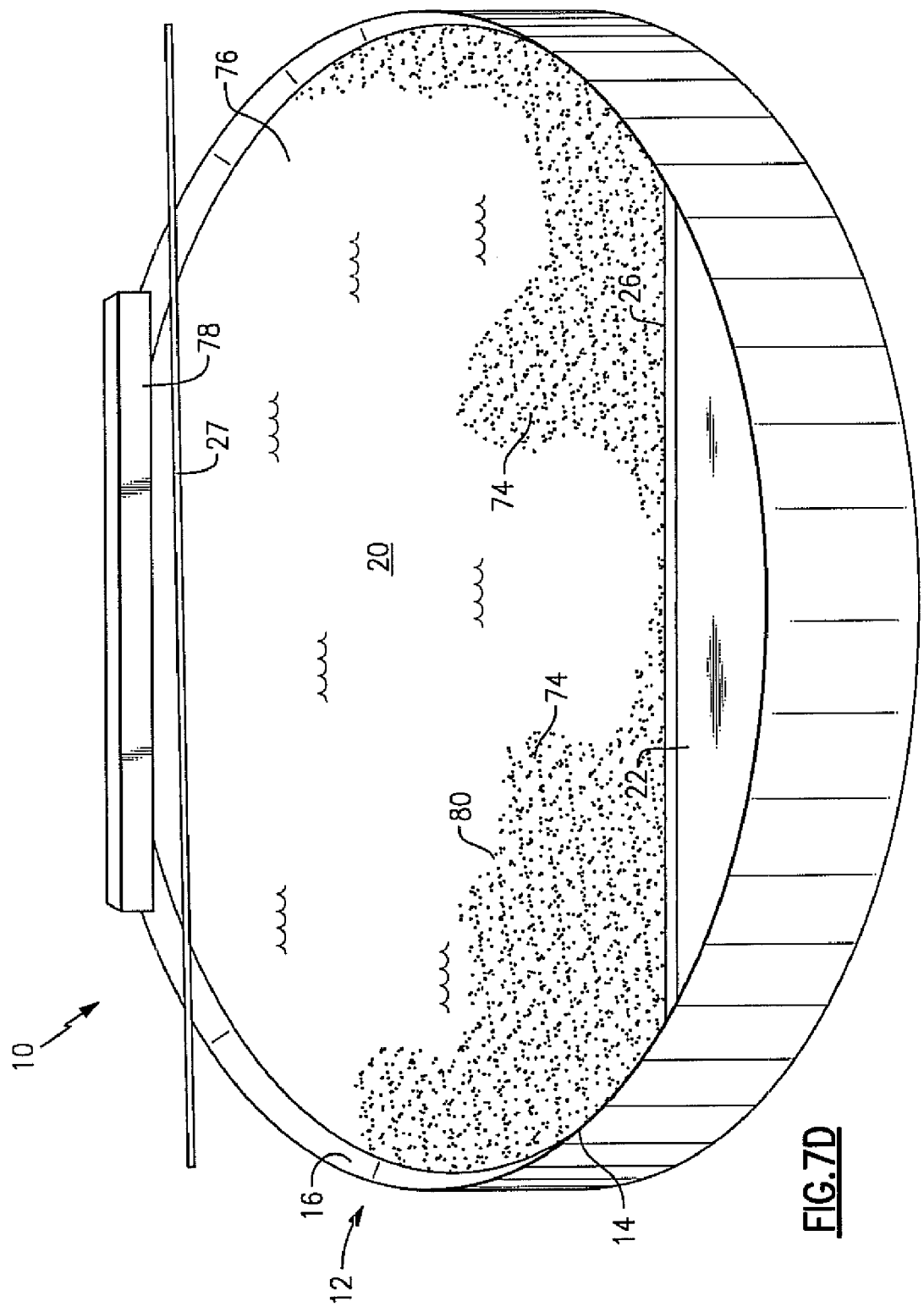
Figure 7E:
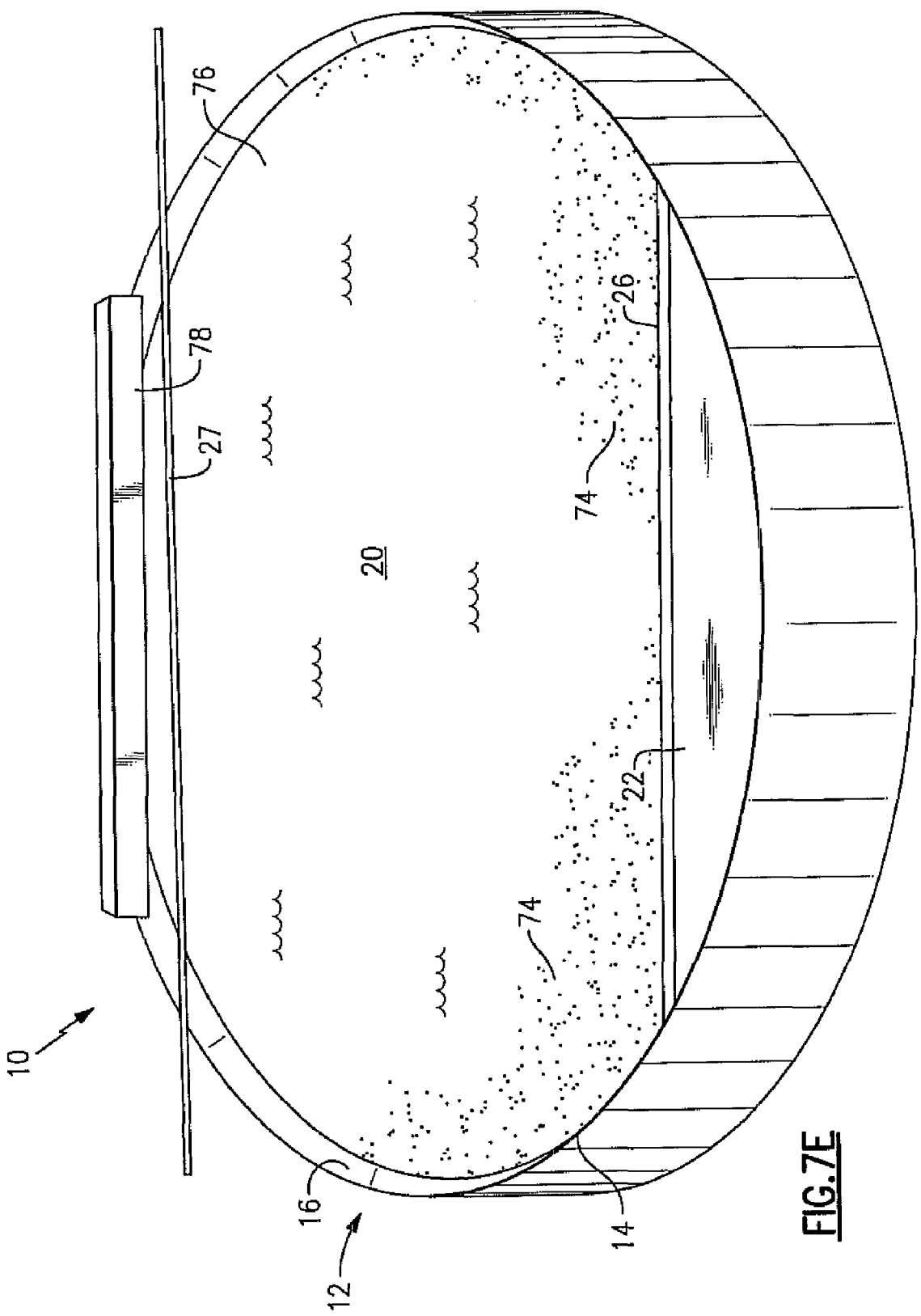

In contrast to tray 70 or tray 72, tray 10 showed much better distribution of liquid flow, as illustrated in still drawings FIG. 7A through 7E taken at the same intervals and under the same experimental conditions as those shown in FIG. 5A through 6E. In this experiment, inlet receiving area 30 is below inlet 78 that is a downcomer having a downcomer wall 32 comprising first portion 32A, second portion 32B and distributor 32C as shown in FIG. 1 through 3. FIG. 7B through 7D show that liquid 76 containing dye 74 flows in all angular directions from inlet 78 toward outlet downcomer 22, thus is more evenly distributed so as to flow across all parts of deck 20. There is a much reduced amount of backflow. The evenly distributed flow of liquid 76 and the progressive reduction of the intensity of the color of dye 74 across the whole of deck 20 from 10 seconds (FIG. 7B) to 60 seconds (FIG. 7E) shows that dye 74 is well distributed within liquid 76 across the whole of deck 20.

It has been found experimentally that the advantages of the present invention are provided when using a wide range of flow rates of both vapor and liquid, which is not the case for other liquid distribution control means such as baffles or deflectors arrayed across an upper surface of a tray. Thus distributor 32C having discharge ports 50 and flanges 64 provides better distribution of flow of liquid 76 across deck 20 than either baffles or deflectors.

Figure 8:
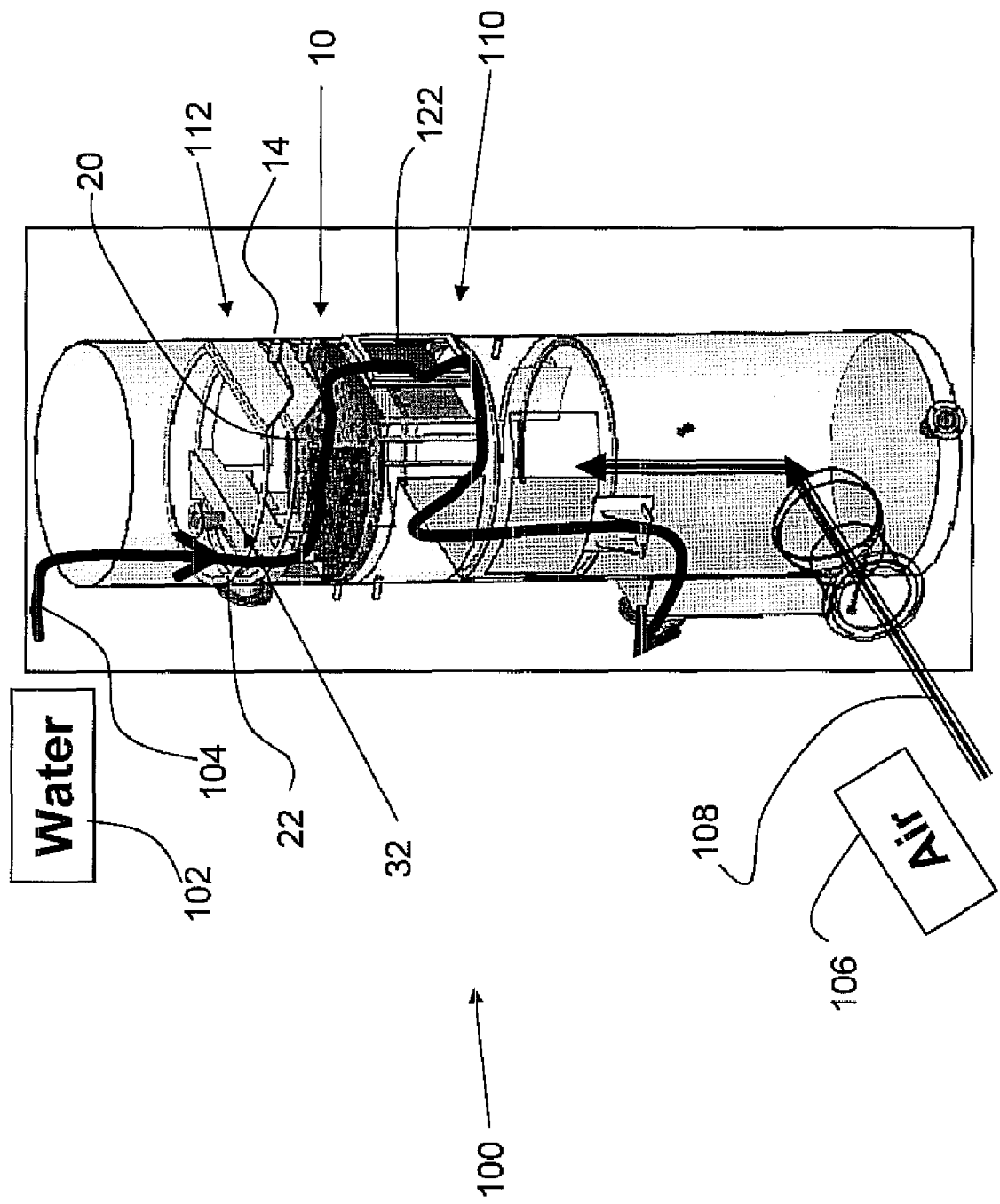
FIG. 8 is a cut-away perspective view of a counter-flow apparatus having the tray shown in FIG. 1 through 3, the tower having: Tower ID, 1,200 mm; Tray spacing, 600 mm; No, of Pass, 1; DC Area, 6.7% TA; Weir Height, 38 mm; Floating Valve Units; number of Tray Valve Units: 131 (~12% open area).

Performance of one tray using an inlet downcomer 22 having distributor 32C of the present invention was compared with that of the same tray having a segmental downcomer according to the prior art using an air-water simulator 100 of a counter-flow apparatus illustrated in FIG. 8. The performances of the trays were measured using apparatus with the parameters: Tower ID, 1,200 mm; Tray Spacing, 600 mm; No. of Pass, 1; DC Area, 6.7% TA; Weir Height, 38 mm; number of Valve Units: 131 (~12% open area).

Air-water simulator 100 comprises a tower 112 having one tray 10 and a receiving tray 110 therebelow. Water 102, following serpentine path 104, was fed via one downcomer 22 to tray 10, crossed deck 20, then exited tray 10 via another downcomer 122 to receiving tray 110, from which it flowed out of tower 112. The following tests were performed with a downcomer wall of downcomer 32 being either downcomer wall 32 having distributor 32C according to the present invention or a conventional downcomer wall. Air 106, following a path illustrated by arrows 108, was fed in countercurrent manner through tower 112, and bubbled through water 102 flowing across deck 20. The performances of a tray and distributor of the present invention over a range of flow rates were compared with that of a tray of conventional design, specifically a segmental tray having downcomer and no distributor 32C. When water was fed via downcomer 22, and said downcomer wall 32 included distributor 32C (not separately identified in FIG. 8), as described with reference to FIGS. 1 through 3, flow of water 102 across deck 20 of tray 10 was more even than when downcomer wall 32 had a structure that did not include said distributor 32C.

Figure 9A:
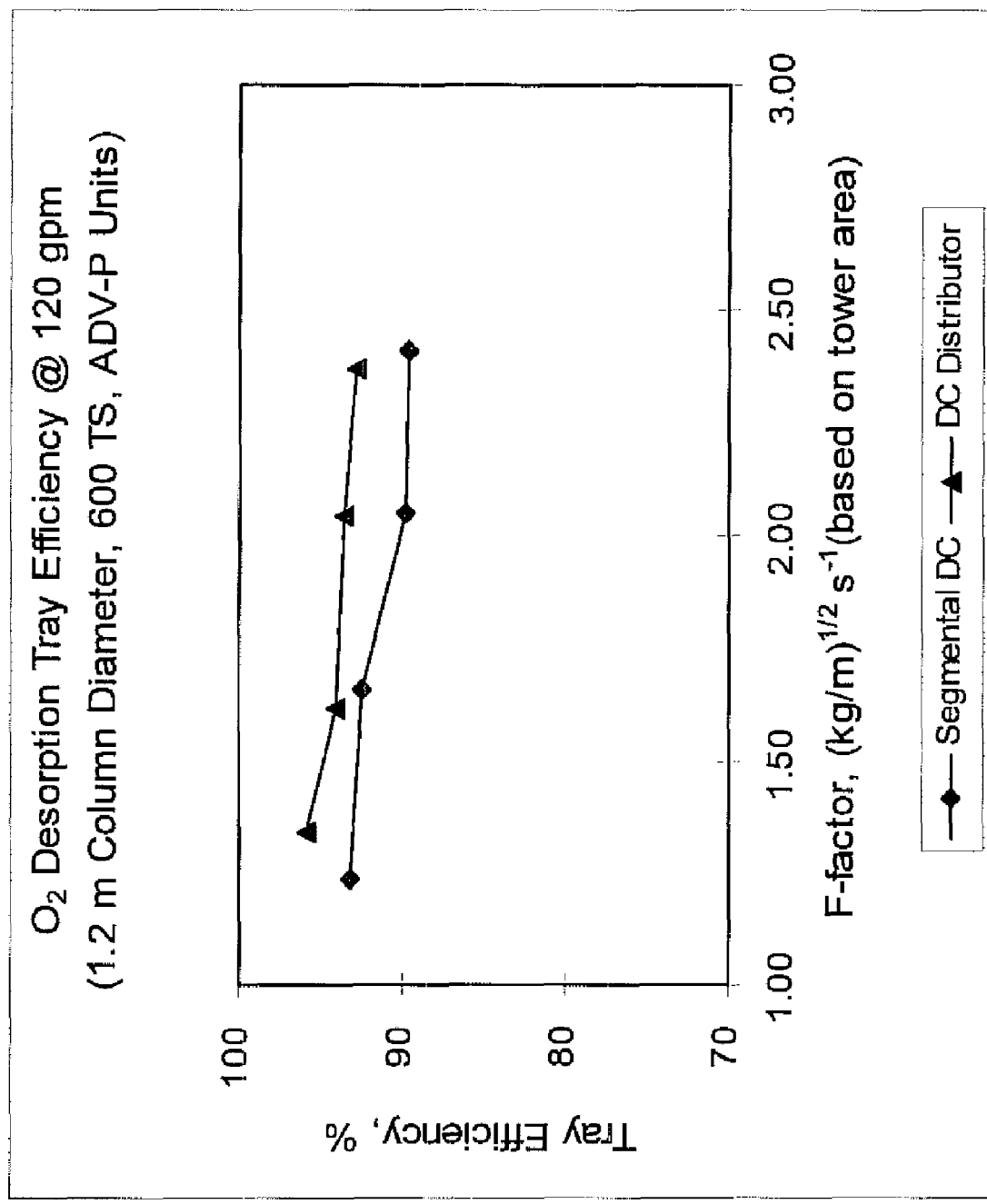
FIG. 9A through 9D are plots comparing oxygen desorption tray efficiencies for the tested tray as a function of F-factor using a 1.2 m internal diameter column air-water tower as shown in FIG. 8, a segmented tray having a conventional downcomer and a tray having a downcomer and a distributor
Figure 9B:
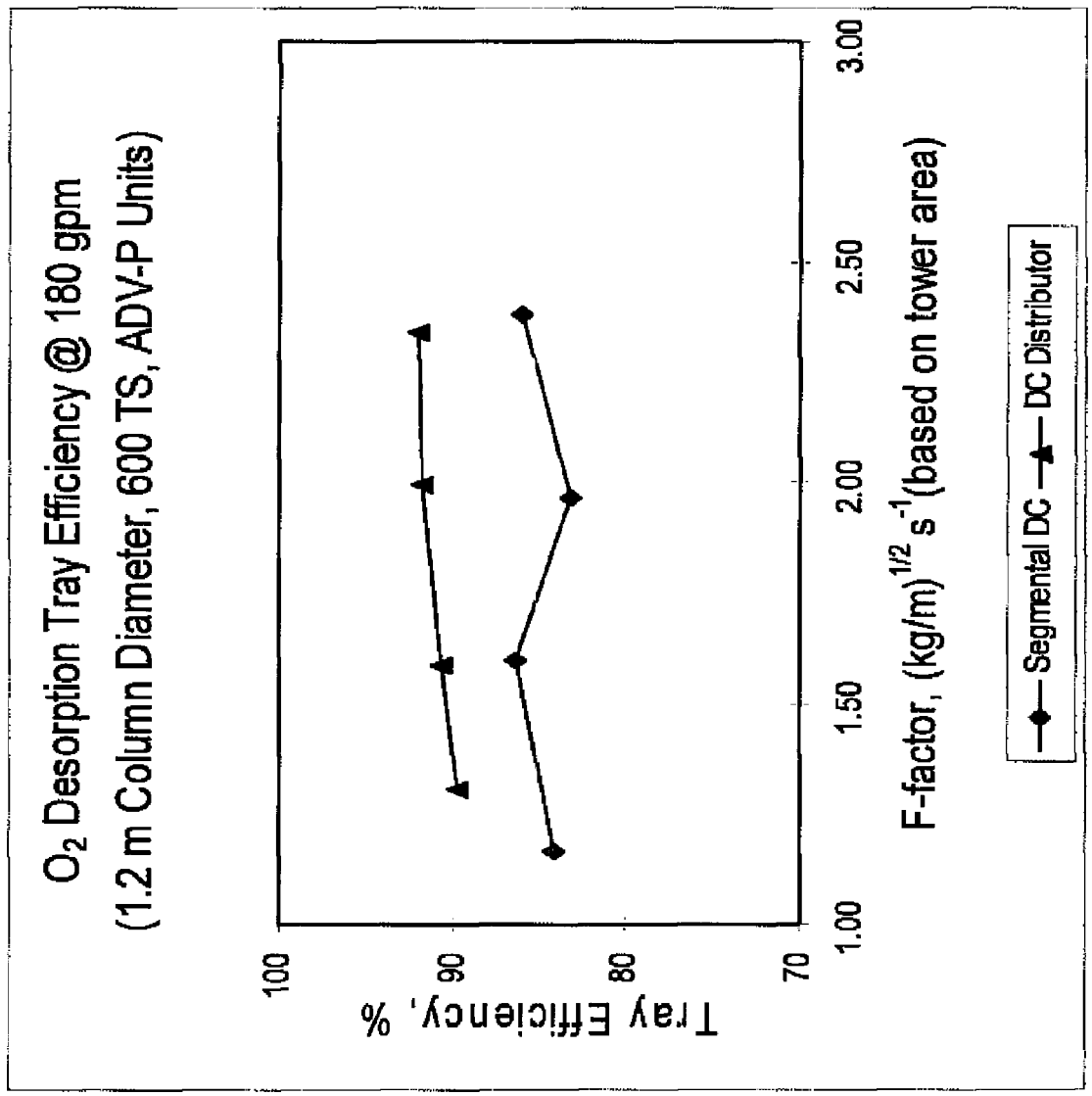
Figure 9C:
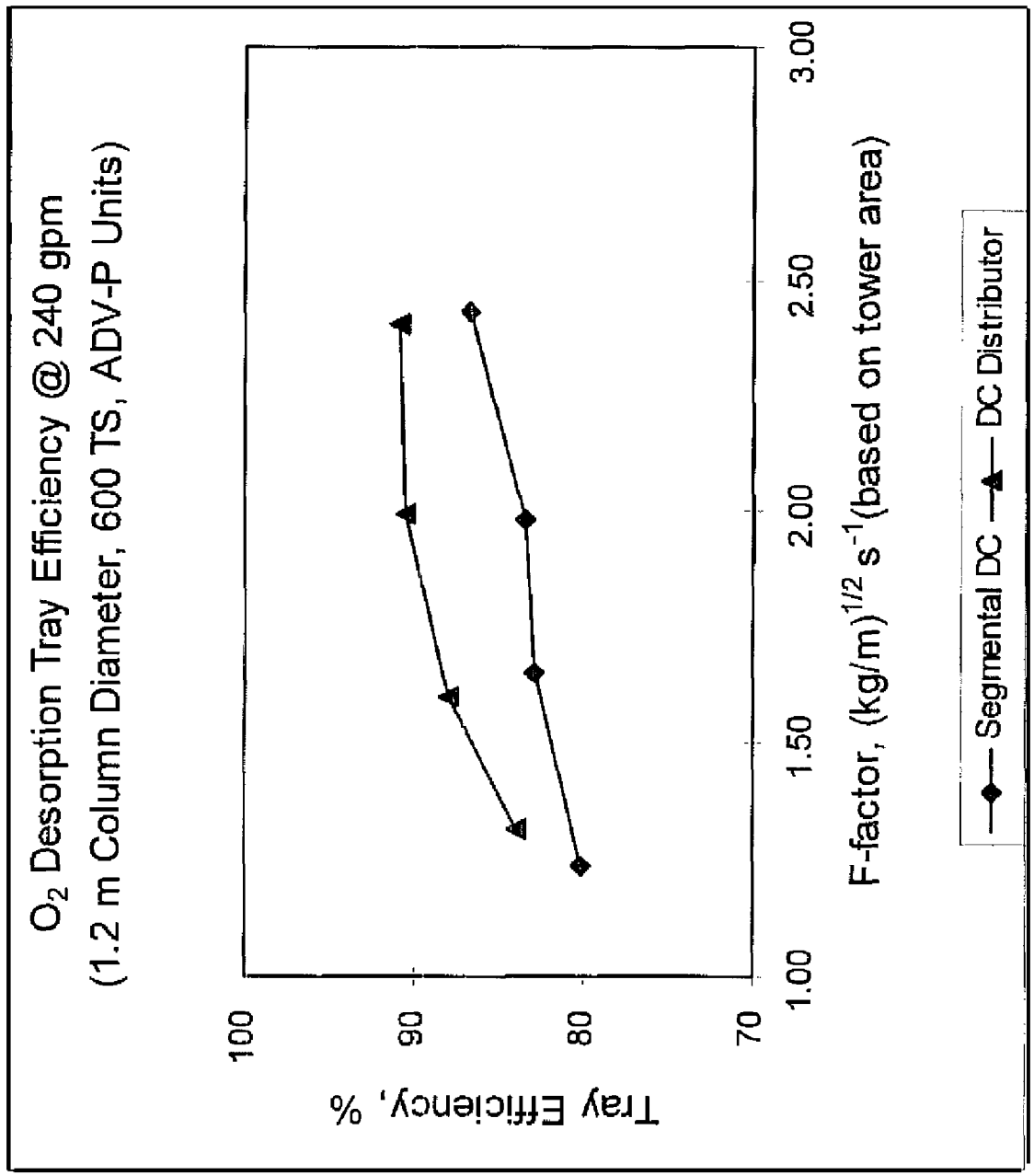
Figure 9D:
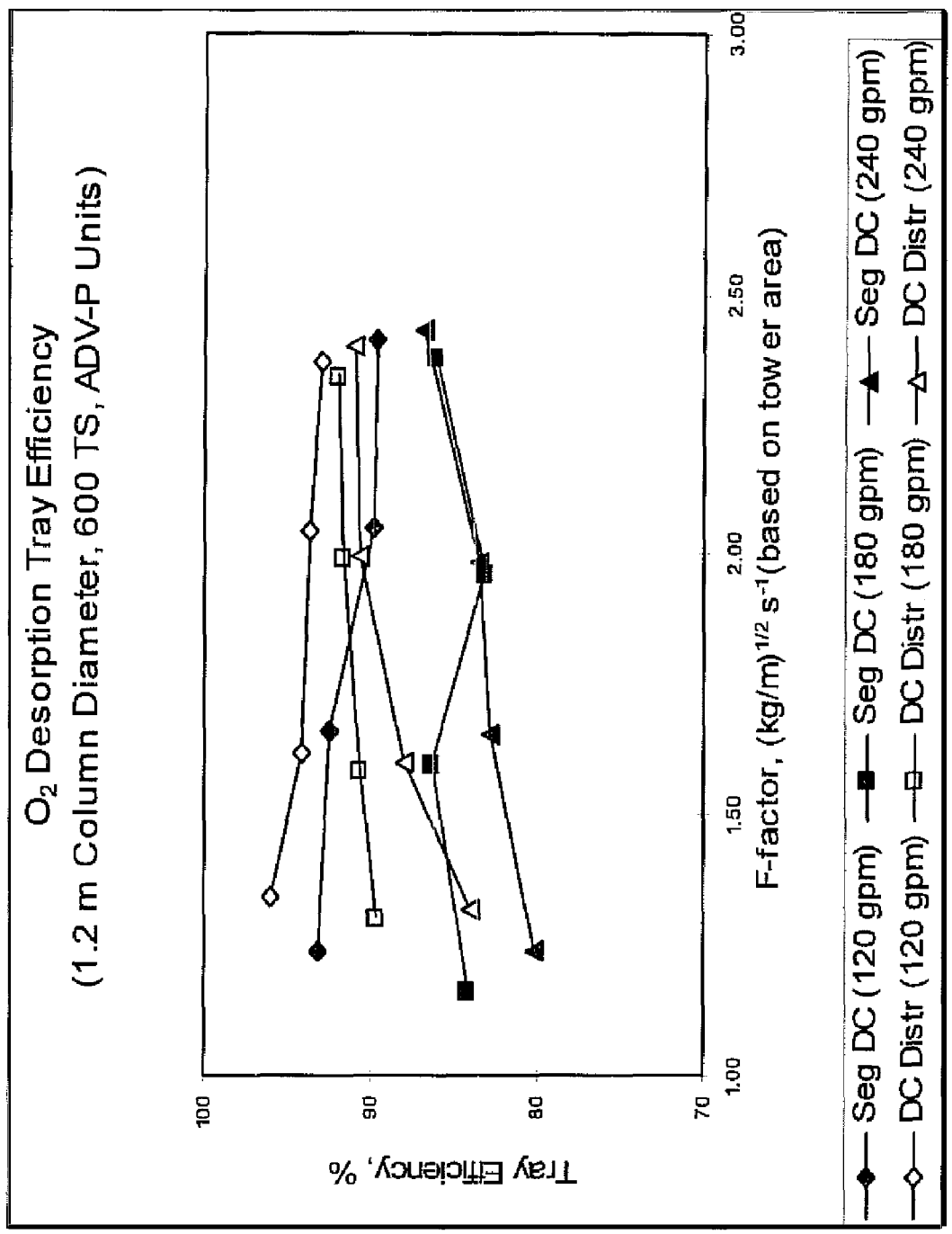

FIG. 9A through 9D show four plots comparing oxygen desorption tray efficiencies as a function of F-factor when using the air-water simulator shown in FIG. 8, for performances of a segmental tray having a conventional downcomer and a tray having a downcomer and a distributor 32C according to the present invention, at three different flow rates, 120 gpm (FIG. 9A), 180 gpm (FIG. 9B), and 240 gpm (FIG. 9C). FIG. 9D compares data for both trays at all three flow rates. At each flow rate the performance of the tray and distributor of the present invention was superior to that of the tray having a segmental downcomer. Further, the performance of tray 10 and distributor 32C according to the present invention was similar over the range of flow rates.

Thus the long sought goal of more evenly distributed liquid flow across all of deck 20 of tray 10 is achieved through incorporation of distributor 32C as a portion of downcomer wall 32 of another tray 10 immediately above inlet distribution area 30 of said deck 20. The incorporation of downcomer distributor 32C of the present invention thus provides great advantages for use in gas-liquid contact towers when compared with prior art tray designs.

It will be recognized that the principles discussed above may be used to design trays for different types of towers aside from the example discussed above, and with various downcomer layout patterns.

The tray design allows for a higher capacity and efficiency, in which the distribution of volumetric liquid flow across the tray deck is essentially similar for all paths along which that liquid flows. Some of the benefits that may be achieved using these principles include no stagnant regions above the tray decks, and no areas in which there is back-flow, thus enabling efficient and effective utilization of the entire area of the tray deck for mass transfer.

In this patent document, the word "comprising" is used in its non-limiting sense to mean that items following the word are included, but items not specifically mentioned are not excluded. A reference to an element by the singular indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims. It will also be recognized that the modifications made to the illustrated embodiment may also be incorporated beneficially into trays of alternative designs that incorporate other modifications intended to improve tray performance.

What is claimed is:

1. A chemical process tower having walls with an inner surface to which more than one tray assembly for gas/liquid contact can be affixed, each tray assembly comprising a tray deck, and at least one inlet distribution area, wherein at least one tray assembly comprises at least one downcomer, and wherein:
    each downcomer is bounded on at least one side by a downcomer wall, and
    a downcomer of a first tray assembly is situated above a corresponding inlet distribution area of a second tray assembly immediately below the first tray assembly;
    the downcomer wall extends downward from an edge of the first tray deck toward the tray deck of the second tray assembly, the downcomer wall having a first portion, a second portion, and a third portion that is a distributor, wherein the first portion is attached across the length of the edge of the deck, the second portion extends below the first portion, and the third portion has architecture so as to serve as a distributor;
    the distributor has a plurality of discharge ports formed in an outer edge of the distributor, each discharge port having an inner edge toward the center of the distributor and an outer edge toward the outer edges of the distributor, the sizes of discharge ports being scaled so as to apportion the flow descending across the downcomer wall, and a flange extends downward from the inner edge of each discharge port so as to direct the flow of liquid flowing through the respective discharge port;
    there is a gap between the bottom edges of each discharge port and the inlet receiving area of the tray deck of the second tray assembly, the bottom edges of flanges being closely adjacent the deck of the second tray assembly, so that liquid flowing down the downcomer of the first tray assembly is apportioned through the discharge ports and directed by the flanges so as to evenly distribute liquid flow across the deck of the second tray assembly.

2. A chemical process tower according to claim 1, wherein the first portion of the downcomer wall extends substantially vertically downward from the edge of the tray deck.

3. A chemical process tower according to claim 1, wherein the second portion of the downcomer wall extends downward at an angle relative to the first portion.

4. A chemical process tower according to claim 1, wherein there is an outlet weir that is situated upon the first tray deck at a position adjacent to the first edge of the first tray deck.

5. A chemical process tower according to claim 1, wherein there is an inlet weir that is situated upon the second tray deck at a position adjacent to the inlet distribution area.

6. A chemical process tower according to claim 1, wherein the discharge ports of the distributor increase in size from the discharge ports toward the middle of the distributor to the discharge ports toward the walls of the tower.

7. A chemical process tower according to claim 1, wherein the discharge ports are V-shaped.

8. A chemical process tower according to claim 7, wherein the V-shaped discharge ports have an approximately right-angled apex.

9. A chemical process tower having walls with an inner surface to which a first tray assembly above a second tray assembly can be affixed, in which each tray assembly comprises a tray deck, at least one inlet distribution area, an outlet weir that is situated upon the first tray deck at a position adjacent to a first edge of the first tray deck, and an inlet weir that is situated upon the tray deck at a position adjacent to the inlet distribution area, wherein at least the first tray assembly comprises at least one downcomer, and wherein:
    a downcomer of the first tray assembly is situated above an inlet distribution area of the second tray assembly, the downcomer being bounded on at least one side by a downcomer wall;
    the downcomer wall extends downward from an edge of the tray deck of the first tray assembly toward a lower tray deck of the second tray assembly, the downcomer wall has a first portion, a second portion, and a third portion that is a distributor, the first portion being attached to and extending downward substantially vertically from across the length of the edge of the deck, the second portion extending at an angle below the first portion, and the third portion having architecture so as to serve as a distributor;
    the distributor has a plurality of V-shaped discharge ports formed in an outer edge of the distributor, each discharge port having an inner edge toward the center of the distributor and an outer edge toward an outer edge of the distributor, the discharge ports being individually sized so as to apportion the flow descending across the downcomer wall,
    the discharge ports of the distributor increase in size from the discharge ports toward the middle of the distributor to the discharge ports toward the walls of the tower;
    a flange extends downward from the inner edge of each discharge port;
    there is a first gap between the bottom edges of each discharge port and the inlet receiving area of the tray deck of the second tray assembly, the bottom edges of flanges being closely adjacent the tray deck of the second tray assembly, so that liquid flowing into the downcomer is apportioned and directed so as to evenly distribute liquid flow across the tray deck of the second tray assembly below the downcomer having the distributor.

10. A tray for a gas/liquid contact column comprising:
    a tray deck;
    an inlet distribution area; and
    a downcomer, the downcomer comprising:
        an angled portion, the angled portion extending away from, and downward relative to, the tray deck, the angled portion terminating in a distributor region, the distributor region having a series of discharge ports formed in the angled portion at an outer edge of the distributor, each discharge port having more than one side, at least one side having a flange that extends below the discharge port, such that fluid flowing down the downcomer is distributed as it flows through the distributor region.

11. The tray of claim 10, wherein each discharge port is V-shaped.

12. The tray of claim 10, wherein the size and orientation of each discharge port is selected based on its position along the downcomer to optimize flow distribution.

13. The tray of claim 10, wherein the angled portion of the downcomer is connected to the tray deck by a substantially vertical portion.

14. The tray of claim 10, wherein the tray deck comprises an outlet weir adjacent to the downcomer.

15. The tray of claim 10, wherein the tray deck comprises an inlet weir adjacent to the inlet distribution area.

16. A gas/liquid contact column, comprising:
   a column having an inner surface;
   more than one tray vertically spaced along the inner surface of the column, each tray comprising a tray deck, an inlet distribution area, and a downcomer, the downcomer comprising:
   an angled portion, the angled portion extending away from, and downward relative to, the tray deck, the angled portion terminating in a distributor region, the distributor region having a series of discharge ports formed in the angled portion at an outer edge of the distributor, each discharge port having more than one side, at least one side having a flange that extends below the discharge port toward a lower tray, such that fluid flowing down the downcomer is distributed onto an inlet distribution area of the lower tray.

17. The gas/liquid contact column of claim 16, wherein each discharge port is V-shaped.

18. The gas/liquid contact column of claim 16, wherein the size and orientation of each discharge port is selected based on its position along the downcomer to optimize flow distribution.

19. The gas/liquid contact column of claim 16, wherein the angled portion of the downcomer is connected to the tray deck by a substantially vertical portion.

20. The gas/liquid contact column of claim 16, wherein the tray deck comprises an outlet weir adjacent to the downcomer.

21. The gas/liquid contact column of claim 16, wherein the tray deck comprises an inlet weir adjacent to the inlet distribution area.

22. The gas/liquid contact column of claim 16, wherein the trays alternate orientation within the column, such that the downcomer of an upper tray is positioned above the inlet distribution area of an adjacent, lower tray.

* * * * *